(12) United States Patent
Lassalle-Balier et al.

(10) Patent No.: US 11,199,424 B2
(45) Date of Patent: Dec. 14, 2021

(54) REDUCING ANGLE ERROR IN A MAGNETIC FIELD ANGLE SENSOR

(71) Applicants: ALLEGRO MICROSYSTEMS, LLC, Manchester, NH (US); COMMISSARIAT À L'ÉNERGIE ATOMIQUE ET AUX ÉNERGIES ALTERNATIVES, Paris (FR)

(72) Inventors: Rémy Lassalle-Balier, Bures sur Yvette (FR); Claude Fermon, Orsay (FR); Damien Dehu, La-Ville-du-Bois (FR); Kamil Akmaldinov, Bagneux (FR)

(73) Assignees: ALLEGRO MICROSYSTEMS, LLC, Manchester, NH (US); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 122 days.

(21) Appl. No.: 16/553,641

(22) Filed: Aug. 28, 2019

(65) Prior Publication Data
US 2019/0383646 A1    Dec. 19, 2019

Related U.S. Application Data

(63) Continuation-in-part of application No. 15/884,619, filed on Jan. 31, 2018, now Pat. No. 10,557,726.

(51) Int. Cl.
*G01D 5/16* (2006.01)
(52) U.S. Cl.
CPC ..................... *G01D 5/16* (2013.01)
(58) Field of Classification Search
CPC ................ G01D 5/145; G01D 5/16
See application file for complete search history.

(56) References Cited

U.S. PATENT DOCUMENTS 7,936,144 B2   5/2011   Vig et al.
8,084,969 B2   12/2011  David et al.
(Continued)

FOREIGN PATENT DOCUMENTS

DE   10 2016 104285 A1   9/2016
DE   102016104285 A1 *   9/2016   ............. G01R 33/02
(Continued)

OTHER PUBLICATIONS

U.S. Appl. No. 16/822,488, filed Mar. 18, 2020, Lassalle-Balier et al.
(Continued)

*Primary Examiner* — Alvaro E Fortich
(74) *Attorney, Agent, or Firm* — Daly, Crowley, Mofford & Durkee, LLP

(57) ABSTRACT

In one aspect, a magnetic field angle sensor includes a bridge structure that include a sine bridge configured to generate a sinusoidal signal indicative of a magnetic field along a first axis and a cosine bridge configured to generate a cosinusoidal signal indicative of the magnetic field along a second axis that is orthogonal with respect to the first axis. One of the sine bridge or the cosine bridge includes a first set of at least two magnetoresistance elements, a second set of at least one magnetoresistance element, a third set of at least one magnetoresistance element and a fourth set of at least one magnetoresistance element. An average reference direction of the first set of at least two magnetoresistance elements is equal to an average reference direction of the third set of at least one magnetoresistance element. An average reference direction of the second set of at least one magnetoresistance element is equal to an average direction angle of the fourth set of at least one magnetoresistance element.

34 Claims, 24 Drawing Sheets

(56) References Cited

U.S. PATENT DOCUMENTS

| | | | |
|---|---|---|---|
| 8,138,708 | B2 | 3/2012 | Ward et al. |
| 8,461,782 | B2 | 6/2013 | Ward et al. |
| 8,629,642 | B2 | 1/2014 | Ward et al. |
| 8,716,959 | B2 | 5/2014 | David et al. |
| 8,736,316 | B2 | 5/2014 | Chaware et al. |
| 8,873,944 | B2 | 10/2014 | Latham et al. |
| 9,042,716 | B2 | 5/2015 | Cadugan et al. |
| 9,322,887 | B1 | 4/2016 | Eagen et al. |
| 9,354,284 | B2 | 5/2016 | Latham |
| 9,470,765 | B1 | 10/2016 | Latham |
| 9,529,060 | B2 | 12/2016 | Fermon et al. |
| 9,605,975 | B2 | 3/2017 | Foletto et al. |
| 9,605,979 | B2 | 3/2017 | Eagen et al. |
| 9,625,535 | B2 | 4/2017 | Cadugan et al. |
| 9,719,806 | B2 | 8/2017 | Foletto et al. |
| 9,720,054 | B2 | 8/2017 | Drouin et al. |
| 9,784,594 | B2 | 10/2017 | David et al. |
| 9,804,234 | B2 | 10/2017 | Dressier et al. |
| 9,812,637 | B2 | 11/2017 | Fermon et al. |
| 9,823,090 | B2 | 11/2017 | Foletto et al. |
| 9,823,092 | B2 | 11/2017 | David et al. |
| 9,880,026 | B1 | 1/2018 | Eagen et al. |
| 9,910,087 | B2 | 3/2018 | Eagen et al. |
| 10,036,785 | B2 | 7/2018 | David et al. |
| 10,041,810 | B2 | 8/2018 | Vig et al. |
| 10,290,608 | B2 | 5/2019 | Latham et al. |
| 10,310,028 | B2 | 6/2019 | Latham et al. |
| 10,347,277 | B2 | 7/2019 | Campiglio et al. |
| 10,509,058 | B2 | 12/2019 | Cadugan et al. |
| 10,557,725 | B2 | 2/2020 | Paul et al. |
| 10,585,152 | B2 | 3/2020 | David et al. |
| 2002/0191451 | A1 | 12/2002 | Kishi et al. |
| 2005/0128654 | A1 | 6/2005 | Sapozhnikov |
| 2006/0267581 | A1 | 11/2006 | Wiese |
| 2009/0189601 | A1 | 7/2009 | Okada et al. |
| 2010/0073827 | A1 | 3/2010 | Zhao et al. |
| 2010/0271013 | A1 | 10/2010 | Servel et al. |
| 2010/0301845 | A1 | 12/2010 | Acker |
| 2011/0037459 | A1 | 2/2011 | Okada et al. |
| 2011/0285395 | A1 | 11/2011 | van Veldhoven et al. |
| 2012/0038348 | A1 | 2/2012 | Aimuta et al. |
| 2012/0095712 | A1* | 4/2012 | Komasaki ............... G01D 3/036 702/94 |
| 2012/0119729 | A1 | 5/2012 | Komasaki et al. |
| 2013/0113478 | A1 | 5/2013 | Pant |
| 2013/0335070 | A1 | 12/2013 | Abe et al. |
| 2014/0028307 | A1 | 1/2014 | Ausserlechner |
| 2014/0225605 | A1 | 8/2014 | Lei et al. |
| 2015/0192432 | A1* | 7/2015 | Noguchi ............... G01R 33/09 324/207.2 |
| 2016/0169707 | A1 | 6/2016 | Hirota et al. |
| 2017/0322052 | A1* | 11/2017 | Paul ..................... G01D 5/16 |
| 2018/0224300 | A1 | 8/2018 | Vig et al. |
| 2018/0335484 | A1 | 11/2018 | Campiglio et al. |
| 2018/0335486 | A1 | 11/2018 | Lassalle-Balier et al. |
| 2019/0219643 | A1 | 7/2019 | Cadugan et al. |
| 2019/0234764 | A1 | 8/2019 | Lassalle-Balier |
| 2019/0383646 | A1 | 12/2019 | Lassalle-Balier et al. |
| 2020/0018780 | A1 | 1/2020 | Cadugan et al. |
| 2020/0033424 | A1 | 1/2020 | Campiglio et al. |
| 2020/0041310 | A1 | 2/2020 | Lassalle-Balier et al. |
| 2020/0041583 | A1 | 2/2020 | Cadugan et al. |
| 2020/0041584 | A1 | 2/2020 | Lassalle-Balier et al. |
| 2020/0064413 | A1 | 2/2020 | Campiglio et al. |
| 2020/0066790 | A1 | 2/2020 | Lassalle-Balier et al. |

FOREIGN PATENT DOCUMENTS

| | | | |
|---|---|---|---|
| DE | 10 2015 218 855 A1 | 3/2017 | |
| DE | 102015218855 * | 3/2017 | ............ G01B 21/22 |
| DE | 10 2018 113821 A1 | 12/2018 | |
| EP | 2 674 728 A2 | 12/2013 | |
| JP | 2014-071039 A | 4/2014 | |
| WO | WO 2019/152112 A1 | 8/2019 | |
| WO | WO 2021/040797 A1 | 3/2021 | |

OTHER PUBLICATIONS

PCT International Search Report and Written Opinion dated Oct. 23, 2020 for International Application No. PCT/US2020/046883; 15 Pages.

Reply to official communication dated Aug. 7, 2020 and filed Feb. 11, 2021 in the EPO, Application No. EP18842507.8, 15 pages.

U.S. Appl. No. 16/139,742, filed Sep. 24, 2018, Romero.

U.S. Appl. No. 16/145,841, filed Sep. 28, 2018, Foletto et al.

U.S. Appl. No. 16/157,313, filed Oct. 11, 2018, Lassalle-Balier et al.

U.S. Appl. No. 16/157,317, filed Oct. 11, 2018, Lassalle-Balier et al.

U.S. Appl. No. 16/232,348, filed Dec. 26, 2018, Eagen et al.

U.S. Appl. No. 16/244,452, filed Jan. 10, 2019, Lassalle-Balier et al.

U.S. Appl. No. 16/398,522, filed Apr. 30, 2019, Cesaretti et al.

U.S. Appl. No. 16/420,470, filed May 23, 2019, Tran et al.

U.S. Appl. No. 16/507,560, filed Jul. 10, 2019, Lassalle-Balier et al.

U.S. Appl. No. 16/522,810, filed Jul. 26, 2019, David et al.

U.S. Appl. No. 16/749,074, filed Jan. 22, 2020, Romero.

U.S. Appl. No. 16/800,229, filed Feb. 25, 2020, Lassalle-Balier et al.

U.S. Appl. No. 16/921,191, filed Jul. 6, 2020, Lassalle-Balier.

U.S. Preliminary Amendment filed on Jul. 6, 2020 for U.S. Appl. No. 16/822,488; 16 Pages.

U.S. Appl. No. 16/507,544, filed Jul. 10, 2019, David et al.

U.S. Appl. No. 16/553,633, filed Aug. 28, 2019, Lassalle-Balier et al.

PCT International Search Report and Written Opinion dated Mar. 14, 2019 for International Application No. PCT/US2018/066995; 13 Pages.

U.S. Notice of Allowance dated Feb. 15, 2019 for U.S. Appl. No. 15/884,619; 12 Pages.

U.S. Non-Final Office Action dated May 17, 2019 for U.S. Appl. No. 15/884,619; 29 Pages.

Response to U.S. Non-Final Office Action dated May 17, 2019 for U.S. Appl. No. 15/884,619; Response filed Jun. 24, 2019; 10 Pages.

U.S. Notice of Allowance dated Sep. 4, 2019 for U.S. Appl. No. 15/884,619; 16 Pages.

Jaffrés et al., "Angular Dependence of the Tunnel Magnetoresistance in Transition-Metal-Based Junctions;" Physical Review B, vol. 64, 064427; Jul. 2001; 7 Pages.

PCT International Report on Patentability dated Aug. 13, 2020 For PCT Application No. PCT/US2018/066995; 8 pages.

PCT International Search Report and Written Opinion dated Sep. 6, 2021 for International Application No. PCT/US2021/034432; 15 Pages.

U.S. Notice of Allowance dated Sep. 13, 2021 for U.S. Appl. No. 16/553,633; 13 Pages.

Extended European Search Report dated Jul. 29, 2021 for European Application No. 21156380.4; 9 Pages.

* cited by examiner

REDUCING ANGLE ERROR IN A MAGNETIC FIELD ANGLE SENSOR

RELATED APPLICATIONS

This patent application is a continuation-in-part to U.S. application Ser. No. 15/884,619, filed Jan. 31, 2018 and titled "SYSTEMS AND METHODS FOR REDUCING ANGLE ERROR FOR MAGNETIC FIELD ANGLE SENSORS," which is incorporated herein in its entirety.

BACKGROUND

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

Various parameters characterize the performance of magnetic field sensors and magnetic field sensing elements. With regard to magnetic field sensing elements, the parameters include sensitivity, which is the change in the output signal of a magnetic field sensing element in response to a magnetic field, and linearity, which is the degree to which the output signal of a magnetic field sensor varies linearly (i.e., in direct proportion) to the magnetic field.

Some magnetic field sensors include magnetoresistance (MR) elements, such as giant magnetoresistance (GMR) elements and tunneling magnetoresistance (TMR). Generally, GMR and TMR elements have a relatively high sensitivity compared, for example, to Hall effect elements. GMR and TMR elements have moderately good linearity, but over a restricted range of magnetic fields. However, even in the restricted range of magnetic fields, the linearity of the GMR or TMR element can suffer from irregularities, such as due to high temperatures.

Further, angle sensors using GMR and TMR elements can experience angle error due to phenomena such as spin flop (i.e., alteration of reference direction at high magnetic fields or anisotropy field (e.g., magnetocrystalline anisotropy or shape anisotropy)). For example, the angle obtained with GMR elements can experience error up to several degrees.

SUMMARY

In one aspect, a magnetic field angle sensor includes a bridge structure that include a sine bridge configured to generate a sinusoidal signal indicative of a magnetic field along a first axis and a cosine bridge configured to generate a cosinusoidal signal indicative of the magnetic field along a second axis that is orthogonal with respect to the first axis. One of the sine bridge or the cosine bridge includes a first set of at least two magnetoresistance elements, a second set of at least one magnetoresistance element, a third set of at least one magnetoresistance element and a fourth set of at least one magnetoresistance element. An average reference direction of the first set of at least two magnetoresistance elements is equal to an average reference direction of the third set of at least one magnetoresistance element. An average reference direction of the second set of at least one magnetoresistance element is equal to an average direction angle of the fourth set of at least one magnetoresistance element.

The aspect above may include one or more of the following features. The first set of at least two magnetoresistance elements may include at least two magnetoresistance elements arranged in series. The first set of at least two magnetoresistance elements may include at least two magnetoresistance elements arranged in parallel. The first set of at least two magnetoresistance elements may include two or more magnetoresistance elements arranged in series and at least one magnetoresistance element arranged in parallel with the two or more magnetoresistance elements. The second set of at least one magnetoresistance element may include at least two magnetoresistance elements. The second set of at least one magnetoresistance elements may include at least two magnetoresistance elements arranged in series. The second set of at least one magnetoresistance elements may include at least two magnetoresistance elements arranged in parallel. The second set of at least two magnetoresistance elements may include at least one magnetoresistance element arranged in series and two or more magnetoresistance elements arranged in parallel with the at least one magnetoresistance element. The third set of at least one magnetoresistance element may include at least two magnetoresistance elements. The third set of at least one magnetoresistance elements may include at least two magnetoresistance elements arranged in series. The third set of at least one magnetoresistance elements may include at least two magnetoresistance elements arranged in parallel. The third set of at least two magnetoresistance elements may include at least three magnetoresistance elements arranged in series and two or more magnetoresistance elements arranged in parallel with the at least three magnetoresistance elements. The fourth set of at least one magnetoresistance element may include at least two magnetoresistance elements. The fourth set of at least one magnetoresistance elements may include at least two magnetoresistance elements arranged in series. The fourth set of at least one magnetoresistance elements may include at least two magnetoresistance elements arranged in parallel. A resistance of the first set of at least two magnetoresistance elements may be equal to a resistance of the third set of at least one magnetoresistance element. A resistance of the second set of at least one magnetoresistance element may be equal to a resistance of the fourth set of at least one magnetoresistance element. The average reference direction of the first set of at least two magnetoresistance elements may be opposite the average reference direction of the second set of at least one magnetoresistance element. The first set of at least two magnetoresistance elements may include a first magnetoresistance element having a reference angle that is at an angle $\varphi_C$ from the average reference angle of the first set of at least two magnetoresistance elements; and a second magnetoresistance element having a reference angle that is at an angle $-\varphi_C$ from the average reference angle of the first set of at least two magnetoresistance elements. The angle $\varphi_C$ may be between 20° and 40°. The angle $\varphi_C$ may be between 25° and 37°. The $\varphi_C$ may be 22.5°. The angle $\varphi_C$ may be associated with at least one harmonic error of a magnetoresistance element. The angle $\varphi_C$ may be associated with a fourth harmonic error of a magnetoresistance element. The first set of at least two magnetoresistance elements may include a first magnetoresistance element having a reference angle that is an adjusted angle, $\varphi_{adj}$, from the average reference angle of the first set of at least two magnetoresistance elements; a second magnetoresistance element having a reference angle that is $-\varphi_{adj}$ from the average reference angle of the first set of at least two magnetoresistance elements and a third magnetoresistance element having a reference direction in a sensitive direction and the sensitive direction is an average reference direction of the first, second and third magnetoresistance elements. The other one of the sine bridge or the cosine bridge may include a fifth set of at least two magnetoresistance elements, a sixth set of at least one magnetoresistance element, a seventh set of at least one magnetoresistance element and an eighth set of at least one magnetoresistance element. An average reference direction of the fifth set of at least two magnetoresistance elements may be equal to an average reference direction of the seventh set of at least one magnetoresistance element and an average reference direction of the sixth set of at least one magnetoresistance element may be equal to an average direction angle of the eighth set of at least one magnetoresistance element. The fifth set of at least two magnetoresistance elements, the sixth set of at least one magnetoresistance element, the seventh set of at least one magnetoresistance element and the eighth set of at least one magnetoresistance element may include one or more of giant magnetoresistance (GMR) elements, anisotropic magnetoresistance (AMR) elements, tunneling magnetoresistance (TMR) elements or magnetic tunnel junction (MTJ) elements. Each of the fifth set of at least two magnetoresistance elements, the sixth set of at least one magnetoresistance element, the seventh set of at least one magnetoresistance element and the eighth set of at least one magnetoresistance element may include a reference layer and a free layer. The first set of at least two magnetoresistance elements, the second set of at least one magnetoresistance element, the third set of at least one magnetoresistance element and the fourth set of at least one magnetoresistance element may include one or more of giant magnetoresistance (GMR) elements, anisotropic magnetoresistance (AMR) elements, tunneling magnetoresistance (TMR) elements or magnetic tunnel junction (MTJ) elements. Each of the first set of at least two magnetoresistance elements, the second set of at least one magnetoresistance element, the third set of at least one magnetoresistance element and the fourth set of at least one magnetoresistance element may include a reference layer and a free layer. The magnetic field angle sensor may include one or more of a voltage bridge, a current bridge or a conductance bridge.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAIL DESCRIPTION

Described herein are techniques to replace magnetoresistance (MR) elements in a bridge of a magnetic field angle sensor to reduce angle errors.

As is known, there are different types of magnetoresistance elements, for example, a giant magnetoresistance (GMR) element, an anisotropic magnetoresistance element (AMR), and a tunneling magnetoresistance (TMR) element, also called a magnetic tunnel junction (MTJ) element.

Of these magnetoresistance elements, the GMR and the TMR elements operate with spin electronics (i.e., electron spins) where the resistance is related to the magnetic orientation of different magnetic layers separated by nonmagnetic layers. In spin valve configurations, the resistance is related to an angular direction of a magnetization in a so-called "free-layer" respective to another layer so-called "reference layer." The free layer and the reference layer are described more fully below.

The magnetoresistance element may be a single element or, alternatively, may include two or more magnetoresistance elements arranged in various configurations, e.g., a half bridge or full (Wheatstone) bridge.

As used herein, the term "magnetic field angle sensor" is used to describe a circuit that uses a magnetic field sensing element, generally in combination with other circuits. In a typical magnetic field sensor, the magnetic field sensing element and the other circuits can be integrated upon a common substrate.

Figure 1:
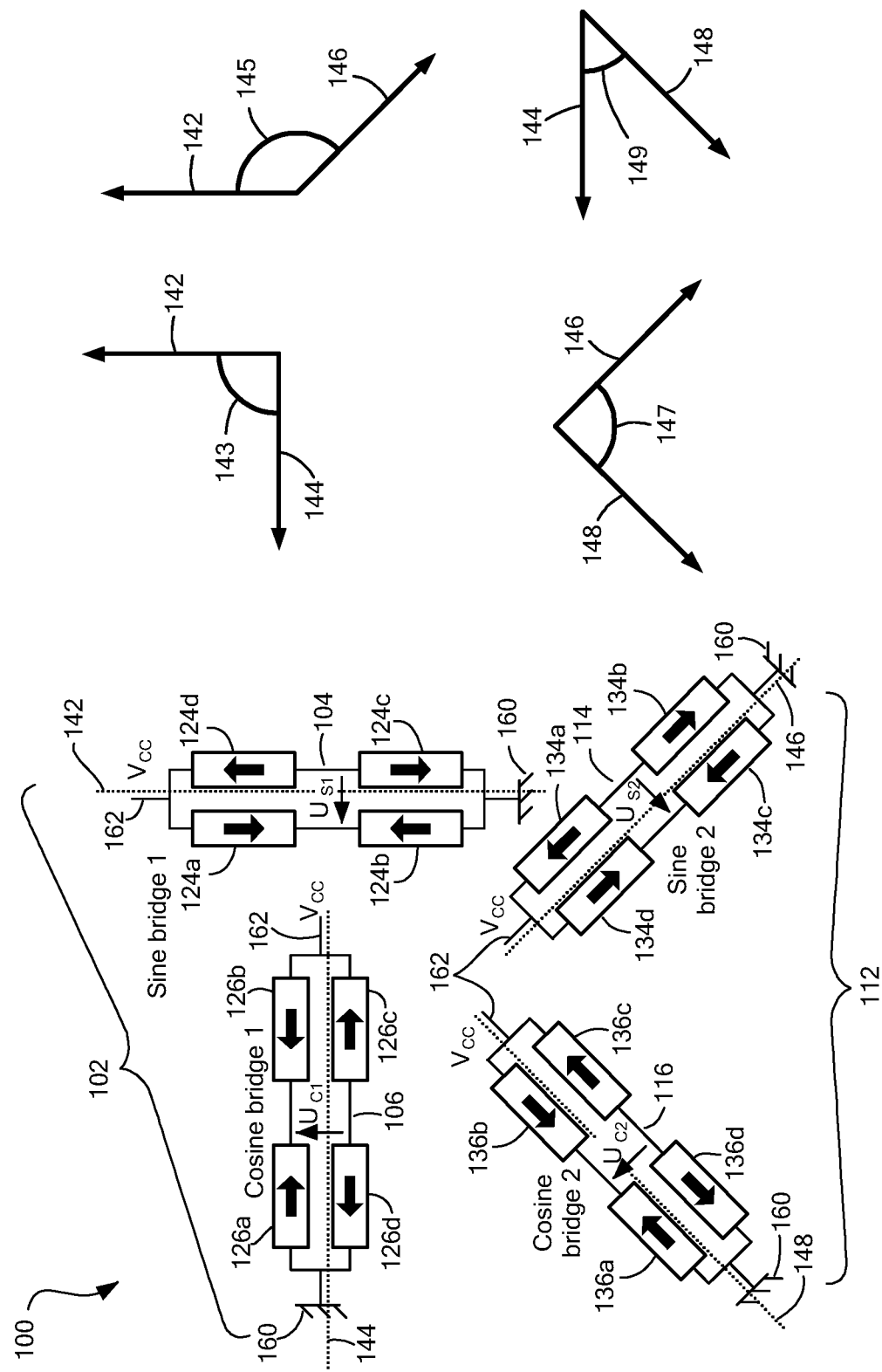
FIG. 1 shows a diagram of two bridge structures of an angle sensor, with each bridge structure having a sine bridge and a cosine bridge.

Now referring to FIG. 1, an angle sensor 100 is illustrated having a first bridge structure 102 and a second bridge structure 112. First bridge structure 102 includes a first sine bridge 104 and a first cosine bridge 106, and second bridge structure 112 includes a second sine bridge 114 and a second cosine bridge 116. Angle sensor 100 can be configured to detect a direction of a magnetic field based in part on signals generated from each of first sine bridge 104, first cosine bridge 106, second sine bridge 114, and second cosine bridge 116.

For example, first and second bridge structures 102, 112 can be formed as gradiometers and be configured to detect different properties of the magnetic field. First sine bridge 104 of first bridge structure 102 and second sine bridge 114 of second bridge structure 112 can measure the sine of the magnetic field. First cosine bridge 106 of first bridge structure 102 and second cosine bridge 116 of second bridge structure 112 can measure the cosine of the magnetic field. Thus, each of first and second bridge structures 102, 112 can measure sine and cosine properties of the magnetic field.

More particularly, each of first sine bridge 104, first cosine bridge 106, second sine bridge 114, and second cosine bridge 116 can measure projections and/or properties of the magnetic field along respective axes. For example, and as illustrated in FIG. 1, first sine bridge 104 is disposed along a first axis 142 and first cosine bridge 106 is disposed along a second axis 144. In an embodiment, an angle 143 between first axis 142 and second axis 144 may be approximately 90°. Also, as illustrated in FIG. 1, second sine bridge 114 is disposed along a third axis 146 and second cosine bridge 116 is disposed along a fourth axis 148. In an embodiment, an angle 147 between third axis 146 and fourth axis 148 may be approximately 90°.

The third and fourth axes 146, 148 of the second bridge structure 112 can be tilted at an angle (i.e., tilt angle) with respect to the first and second axes 142, 144 of the first bridge structure 102, that is a factor of 90°. For example, a tilt angle 145 between first axis 142 and third axis 146 can be approximately 45° and a tilt angle 149 between second axis 144 and fourth axis 148 can be approximately 45°. It should be appreciated that the tilt angles 145, 149 between axes of different bridge structures can vary based at least in part on the number of bridge structures of a particular angle sensor. For example, in some embodiments, the tilt angle between axes of different bridge structures can include any angle between about −90° to about 90°.

Each of first and second bridge structures 102, 112 includes a plurality of magnetoresistance elements. For example, and as illustrated in FIG. 1, the first sine bridge 104 includes a plurality of magnetoresistance elements 124a-124d, the first cosine bridge 106 includes a plurality of magnetoresistance elements 126a-126d, the second sine bridge 114 includes a plurality of magnetoresistance elements 134a-134d, and the second cosine bridge 116 includes a plurality of magnetoresistance elements 136a-136d. It should be appreciated that although FIG. 1 illustrates of each bridge structure having four magnetoresistance elements, the bridge structures described herein may include more or less magnetoresistance elements based at least in part on a particular application of angle sensor 100.

Each first sine bridge 104, first cosine bridge 106, second sine bridge 114, and second cosine bridge 116 can have a first terminal coupled to a voltage supply terminal (e.g., Vcc) 162 and a second terminal coupled to a ground terminal 160. In other embodiments, each first sine bridge 104, first cosine bridge 106, second sine bridge 114, and second cosine bridge 116 can have the first terminal coupled to a current supply terminal (e.g., Icc) and the second terminal coupled to a ground terminal 160.

Figure 1A:
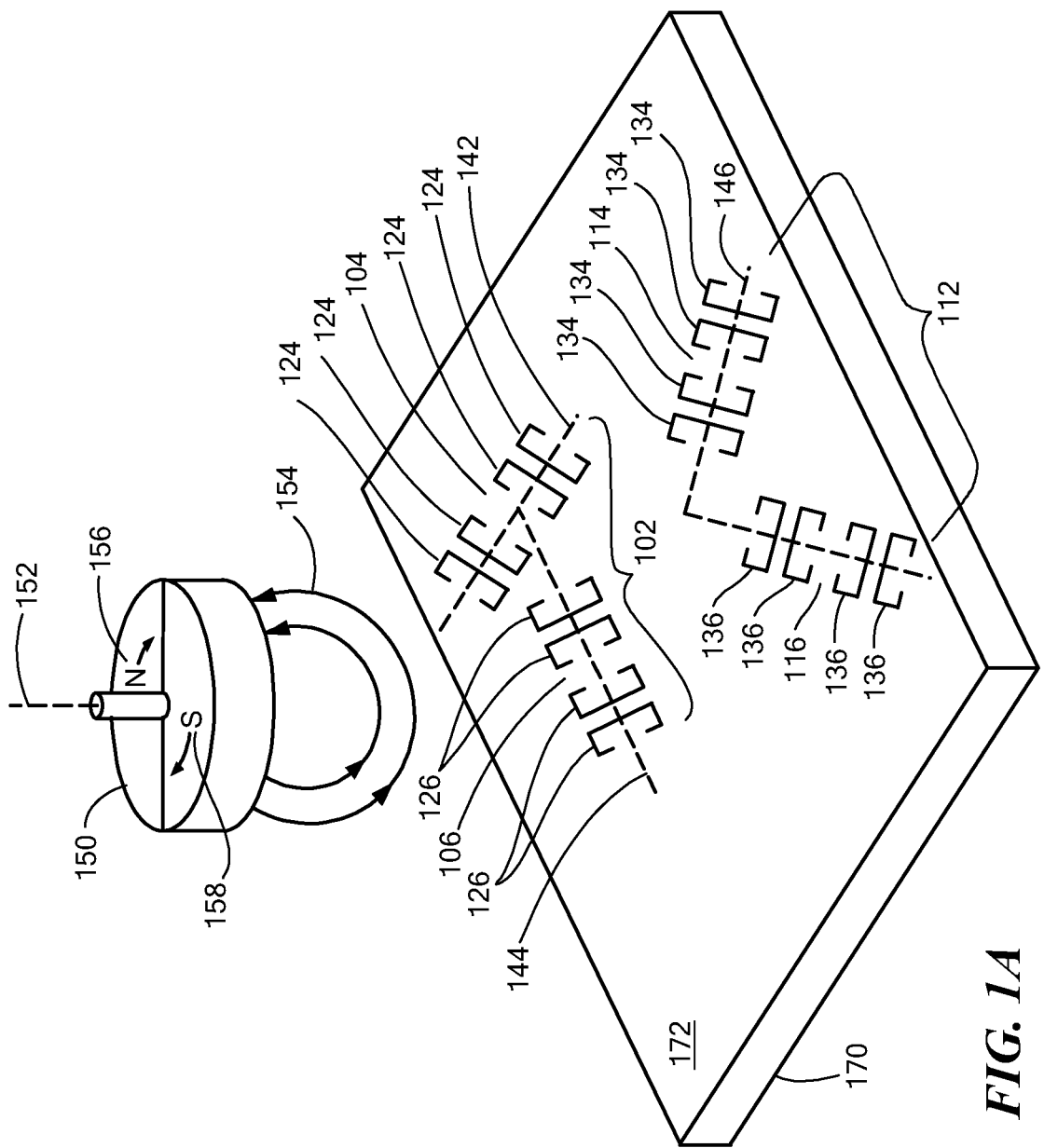
FIG. 1A shows the two bridge structures of FIG. 1 disposed on a substrate and relative to a magnet.

Now referring to FIG. 1A, angle sensor 100 includes first and second bridge structures 102, 112 disposed on a first surface 172 of a substrate 170. Angle sensor 100 can be configured to detect a direction of a magnetic field 154 generated by magnet 150 as it rotates about an axis 152. Magnet 150 can include a north pole 156 and a south pole 158 and magnetic field 154 (e.g., magnetic field flux lines) can run between north pole 156 and south pole 158.

Angle sensor 100 can measure projections of magnetic field 154 along each of a plurality of different axes 142, 144, 146, 148. For example, first sine bridge 104 can measure components of magnetic field 154 along first axis 142 and generate a first sinusoidal signal indicative of magnetic field 154 along first axis 142. First cosine bridge 106 can measure components of magnetic field 154 along second axis 144 and generate a first cosinusoidal signal indicative of magnetic field 154 along the second axis 144. Second sine bridge 114 can measure components of magnetic field 154 along third axis 146 and generate a second sinusoidal signal indicative of magnetic field 154 along the third axis 146. Second cosine bridge 116 can measure components of magnetic field 154 along fourth axis 148 and generate a second cosinusoidal signal indicative of magnetic field 154 along the fourth axis 148. As will be described in greater detail below with respect to FIGS. 4 and 5, the outputs of first sine bridge 104, first cosine bridge 106, second sine bridge 114, and second cosine bridge 116 can be averaged or otherwise compared to determine the direction of magnetic field 154.

Each of first bridge structure 102 and second bridge structure 112 can measure components of magnetic field 154 along at least two axes as sine bridge 104, first cosine bridge 106, second sine bridge 114, and second cosine bridge 116 are positioned relative to different axes 142, 144, 146, 148 respectively. First bridge structure 102 and second bridge structure 112 can measure components of magnetic field 154 at different angles such that an angle error percentage of the output signal generated by angle sensor 100 can be reduced by a factor corresponding to the number of bridge structures.

For example, the angle error of a signal produced by first bridge structure 102 and second bridge structure 112 can be periodic. However, and as illustrated in FIGS. 1 and 1A, axes of second bridge structure 112 can be tilted at tilt angles with respect to axes of first bridge structure 102 such that the respective angle error associated with signals from each bridge structure is opposite with respect to each other. The outputs of first bridge structure 102 and second bridge structure 112 can be averaged or a mean value between the two outputs can be taken having a reduced error angle based on part on the number of bridge structures, here two in angle sensor 100. In an embodiment, the tilt angle 145 between first axis 142 and third axis 146 and the tilt angle 149 between second axis 144 and fourth axis 148 can be selected to reduce an angle error of angle sensor 100.

Figure 1B:
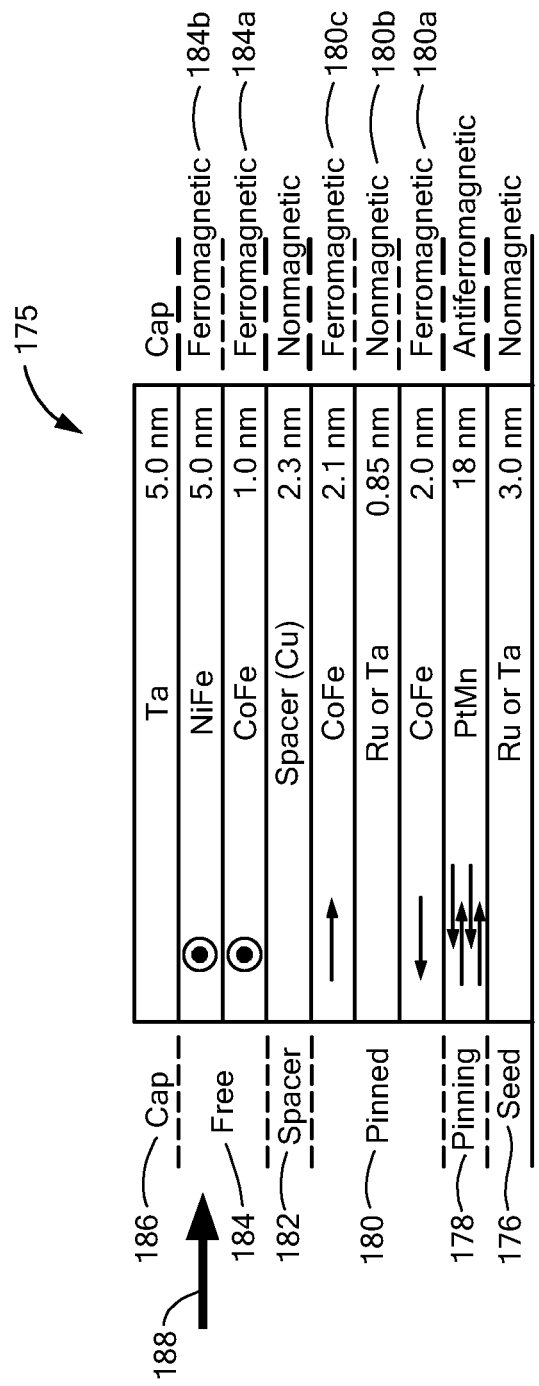
FIG. 1B illustrates layers of a GMR element with a single pinned arrangement.

Now referring to FIG. 1B, a magnetic field sensing element 175 (e.g., MR element, GMR element) includes a plurality of layers disposed over a substrate. Magnetic field sensing element 175 may be the same as or substantially similar to the magnetoresistance elements described above with respect to FIGS. 1 and 1A and described below with respect to FIG. 2.

An upper surface of the substrate is shown as a lowermost line at the bottom of FIG. 1B. In an embodiment, a pinning strength or pinning factor of a reference layer of magnetic field sensing element 175 can be modified to reduce an angle error of an angle sensor including the magnetic field sensing element 175. For example, as the pinning factor of a layer of the one or more magnetoresistance elements of a particular bridge structure increases, the angle error of the bridge structure decreases.

In some embodiments, each bridge structure described here can include a plurality of magnetoresistance elements. Each of the magnetoresistance elements can include a reference layer and a free layer. A pinning (or pinning factor) of the reference layer can range from about 1 kOe to about 3 kOe. In some embodiments, a pinning (or pinning factor) of the reference layer can range from about 1.2 kOe to about 2.5 kOe. It should be appreciated however that the pinning (or pinning factor) of the reference layer can vary based at least in part on an application of the angle sensor. For example, in some embodiments, the pinning (or pinning factor) of the reference layer can be less than 1 kOe or greater than 3 kOe.

In an embodiment, a reference layer may refer to ferromagnetic layer, such as but not limited to ferromagnetic layer 180c. It should be appreciated that the reference layer can refer to the layer from the pinned layers 180 that is interfacing with a spacer layer (here spacer (CU) layer 182) as this layer can modify sensitivity properties (e.g., sensitivity axis) of the magnetic field sensing element 175. The free layer and the reference layer are described more fully below.

On the left side of FIG. 1B, each layer is identified by functional name. On the right side or FIG. 1B are shown magnetic characteristics of sub-layers that can form the functional layers. In general, magnetic materials can have a variety of magnetic characteristics and can be classified by a variety of terms, including, but not limited to, ferromagnetic, antiferromagnetic, and nonmagnetic. Description of the variety of types of magnetic materials is not made herein in detail.

As shown, the magnetic field sensing element 175 can include a seed layer 176 disposed over the substrate, an antiferromagnetic pinning layer 178 disposed over the seed layer 176, and a pinned layer 180 disposed over the antiferromagnetic pinning layer 176. The pinned layer 180 can be comprised of a first ferromagnetic pinned layer 180a, a second ferromagnetic pinned layer 180c, and a spacer layer 180b disposed there between.

The magnetic field sensing element 175 can also include a spacer layer 182 disposed over the second ferromagnetic pinned layer 180c, and a free layer 184 disposed over the spacer layer 182. The spacer layer 180b is a nonmagnetic metallic layer. The spacer 182 is also a nonmagnetic layer, which can be metallic for GMR or insulating for TMR. The free layer 184 can be comprised of a first ferromagnetic free layer 184a and a second ferromagnetic free layer 184b.

A cap layer 186 can be disposed over the free layer 184 to protect the magnetic field sensing element 175.

Examples of thicknesses of the layers of the magnetic field sensing element 175 are shown in nanometers. Examples of materials of the layers of the conventional prior art GMR element are shown by atomic symbols.

Within some layers, arrows are shown that are indicative or directions of magnetic field directions of the layers when the magnetic field sensing element 175 does not experience an external magnetic field. Arrows coming out of the page are indicated as dots within circles and arrows going into the page are indicated as crosses within circles.

Taking the layers from the bottom upward, the seed layer 176 is used to provide a regular crystalline structure upon the substrate that affects crystal properties of layers above.

With regard to the antiferromagnetic pinning layer 178, sub-layers (i.e., layer portions) within the antiferromagnetic pinning layer 178 tend to have magnetic fields that point in alternating different directions indicated by right and left arrows, resulting in the antiferromagnetic pinning layer having a net magnetic field of zero. A top surface of the antiferromagnetic pinning layer 178 tends to have a magnetic moment pointing in one direction, here shown to the left.

In an embodiment, by increasing a pinning factor of ferromagnetic pinned layer 180c, an angle error percentage of an angle sensor can be reduced. For example, to modify the pinning factor of a layer of magnetic field sensing element 175, the shape, thickness or other forms of dimensions can be altered to increase the pinning factor of a layer of magnetic field sensing element 175.

The pinning factor can be modified (or generated) by at least two different techniques. In some embodiments, the pinning factor can be modified (or generated) using synthetic antiferromagnet (SAF), as will be described in greater detail below.

In other embodiments, the pinning factor can be modified (or generated) by modifying the pinning between first ferromagnetic pinned layer 180a and antiferromagnetic pinning layer 178. For example, to increase the pinning factor, the coupling between first ferromagnetic pinned layer 180a and second ferromagnetic pinned layer 180c can be strengthened by reducing the thickness of the spacer 180b or by changing the material of the spacer 180b (e.g., Rh instead of Ru). In some embodiments, the surface of the substrate that magnetic field sensing element 175 is disposed upon can be smoothed out or a roughness of the surface of the substrate can be reduced such that additional coupling can counteract the coupling through the spacer 180b. The thickness and magnetization of the first ferromagnetic pinned layer 180a and second ferromagnetic pinned layer 180c can be balanced to balance the SAF so that the magnetic field (e.g., magnetic field flux lines) emitted by first ferromagnetic pinned layer 180a can be compensated by second ferromagnetic pinned layer 180c. In some embodiments, the thickness of antiferromagnetic pinning layer 178 can be increased to strengthen the anisotropy of the antiferromagnetic pinning layer 178.

With regard to the pinned layer 180, the first ferromagnetic pinned layer 180a tends to couple to the top surface of the antiferromagnetic pinning layer 178, and thus, the magnetic field in the first ferromagnetic pinned layer 180a can by aligned in parallel to the magnetic moments at the top surface of the antiferromagnetic pinning layer 178, here shown to the left.

Due to the presence of the spacer layer 180b between the first and second ferromagnetic pinned layers 180a, 180c the second ferromagnetic pinned layer 180c tends to couple antiferromagnetically with the first ferromagnetic pinned layer 180a, and thus, it has a magnetic field pointing in the other direction, here shown pointing to the right. The combination of the three layers 180a, 180b, 180c can be referred to as a synthetic antiferromagnetic structure or layer.

The first and second free layers 184a, 184b have respective magnetic fields pointing out of the page in the absence of an external magnetic field. This pointing direction can be achieved by creating a specific anisotropy along a direction pointing out of the page. That anisotropy can be created by a shape of the respective magnetic field sensing element (e.g., GMR element). For example, the anisotropy can be created by patterning the magnetic field sensing element 175 (top view) to have a yoke shape, or by a crystalline or a magnetic anisotropy. By created the yoke shape, the free layer 184 has a preferential axis (the yoke axis). If the yoke axis is perpendicular to the reference magnetization a crossed anisotropy can be achieved, which allows obtaining a linear response on a field extension of the order of the free layer anisotropy.

In operation, when the magnetic field sensing element 175 is exposed to an external magnetic field pointing in a direction of an arrow 188, the magnetic fields in the ferromagnetic free layers 184a, 184b tend to rotate to the right to become more aligned (or fully aligned, i.e., pointing to the right) with the magnetic field pointing direction in the second ferromagnetic pinned layer 180c. In an embodiment, a coupling between first ferromagnetic pinned layer 180a and second ferromagnetic pinned layer 180c through spacer layer 180b can be referred to as Ruderman-Kittel-Kasuya-Yosida (RKKY) coupling. The pinned layers 180a, 180c can act as a single unit insensitive to external field. Thus, the pinning layer 178 can be configured to fix the direction and axis of sensitivity of the pinned layers 180a, 180c. For example, the magnetizations in the pinned layer 180 are pinned by the antiferromagnetic pinning layer and do not rotate. The amount of rotation of the magnetic fields in the ferromagnetic free layers 184a, 184b depends upon the magnitude of the external magnetic field. The increased alignment of the magnetic fields in the ferromagnetic free layers 184a, 184b with the direction of the magnetic field in the second ferromagnetic pinned layer 180c tends to make a resistance of the magnetic field sensing element 175 lower.

Conversely, when the GMR element is exposed to an external field pointing opposite to the direction of the arrow 188, the magnetic fields in the free layer 184 tend to rotate to the left to become more anti-aligned (or fully anti-aligned, i.e., pointing to the left) with the magnetic field pointing direction in the second ferromagnetic pinned layer 180c. The amount of rotation depends upon the magnitude of the external magnetic field. The increased anti-alignment of the magnetic fields in the ferromagnetic free layers 184a, 184b with the direction of the magnetic field in the second ferromagnetic pinned layer 180c tends to make a resistance of the magnetic field sensing element 175 higher.

Figure 2:
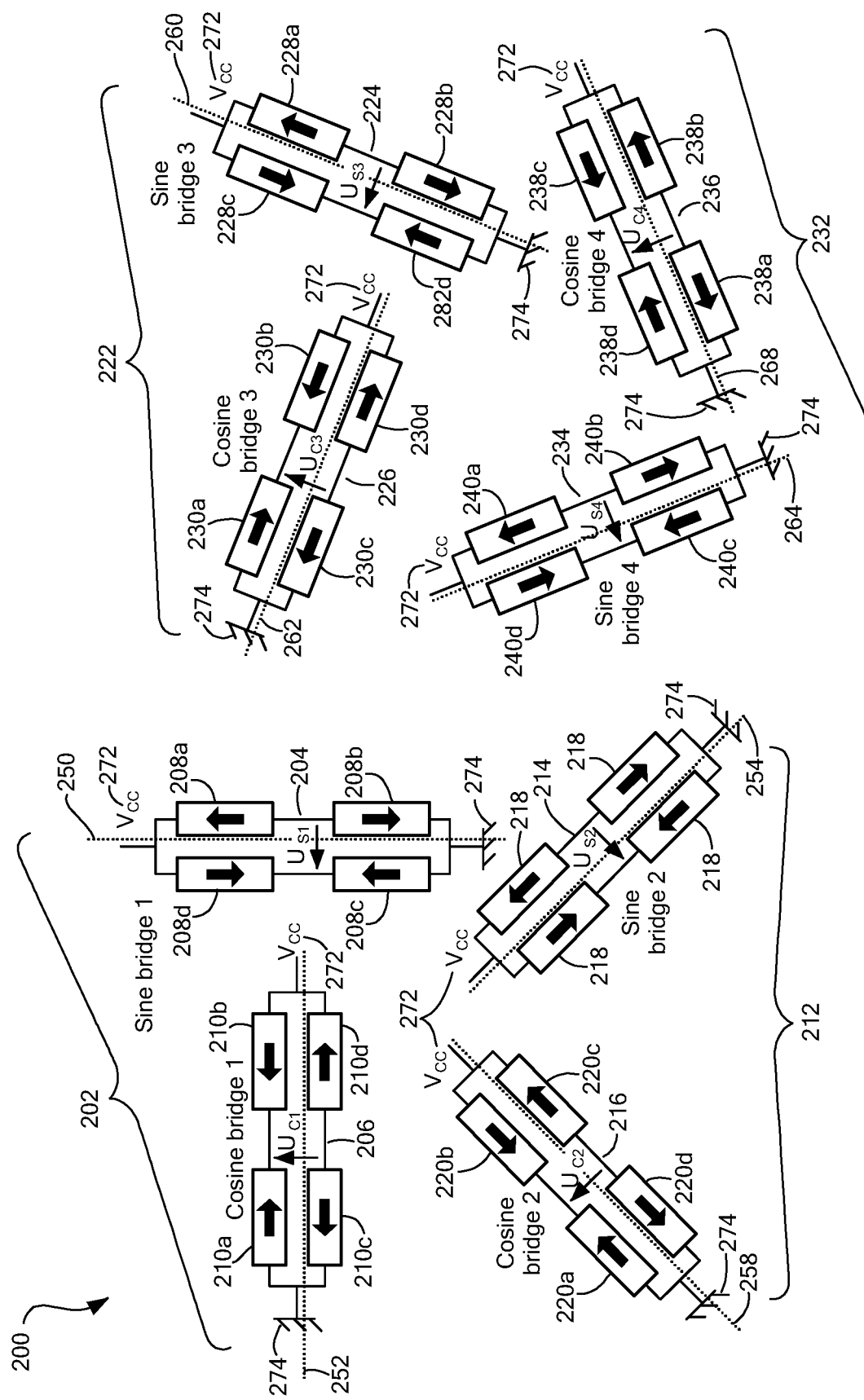
FIG. 2 shows a diagram of an angle sensor having four bridge structures with each bridge structure having a sine bridge and a cosine bridge.
Figure 2A:
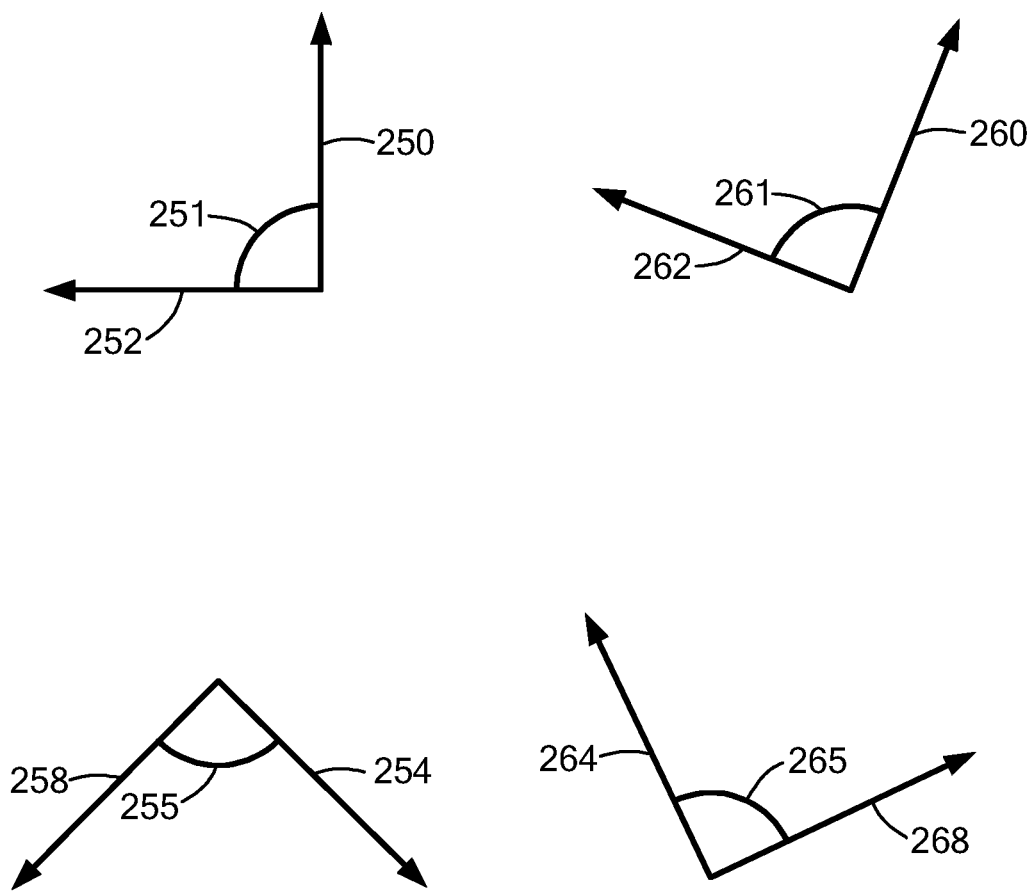
FIG. 2A shows a diagram of different angles between axes of common bridge structures.
Figure 2B:
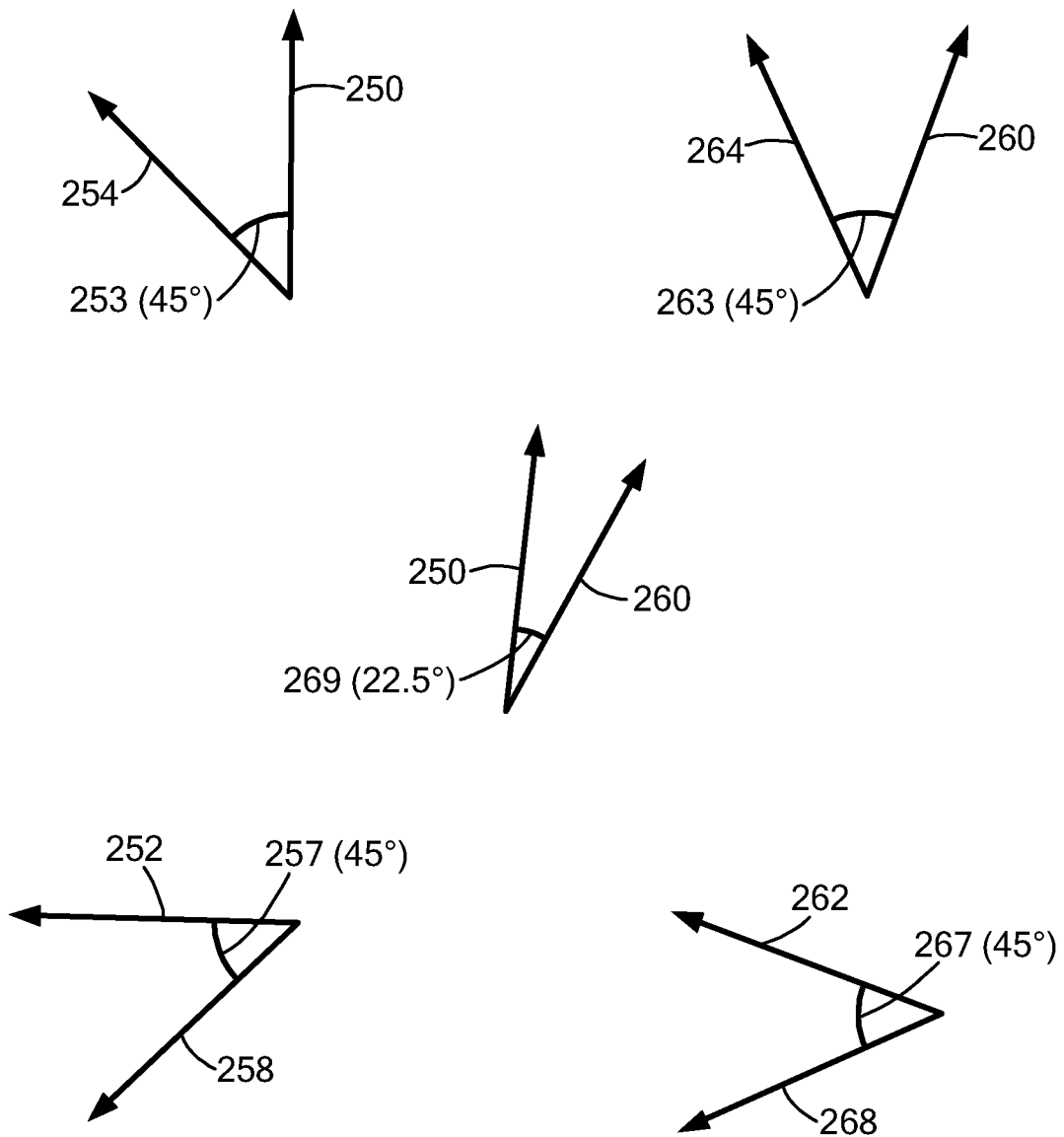
FIG. 2B shows a diagram of different tilt angles between axes of different bridge structures.

Now referring to FIGS. 2 and 2B, an angle sensor 200 includes a first, second, third and fourth bridge structures 202, 212, 222, 232, respectively. Angle sensor 200 may be similar to angle sensor 100, however angle sensor 200 includes four bridge structures.

First bridge structure 202 includes a first sine bridge 204 and a first cosine bridge 206, and second bridge structure 212 includes a second sine bridge 214 and a second cosine bridge 216. Third bridge structure 222 includes a third sine bridge 224 and a third cosine bridge 226, and fourth bridge structure 232 includes a fourth sine bridge 234 and a fourth cosine bridge 236. Angle sensor 200 can be configured to detect a direction of a magnetic field based in part on signals generated from each of first sine bridge 204, first cosine bridge 206, second sine bridge 214, second cosine bridge 216, third sine bridge 224, third cosine bridge 226, fourth sine bridge 234, and fourth cosine bridge 236.

For example, each of first, second, third and fourth bridge structures 202, 212, 222, 232 can measure the sine and cosine of magnetic field components with respect to different axes. First sine bridge 204, of first bridge structure 202, second sine bridge 214 of second bridge structure 112, third sine bridge 224 of third bridge structure 222, and fourth sine bridge 234 of fourth bridge structure 232 can measure the sine of the magnetic field. First cosine bridge 206 of first bridge structure 202 and second cosine bridge 216 of second bridge structure 212, third cosine bridge 226 of third bridge structure 222 and fourth cosine bridge 236 of fourth bridge structure 232 can measure the cosine of the magnetic field.

The sine and cosine bridges of each of first, second, third and fourth bridge structures 202, 212, 222, 232 can measure projections and/or properties of the magnetic field along different axes. For example, and as illustrated in FIG. 2, first sine bridge 204 is disposed along a first axis 250 and first cosine bridge 206 is disposed along a second axis 252. In an embodiment, and an angle 251 between first axis 250 and second axis 252 may be approximately 90° (FIG. 2A). Second sine bridge 214 is disposed along a third axis 254 and second cosine bridge 216 is disposed along a fourth axis 258. In an embodiment, an angle 255 between third axis 254 and fourth axis 258 may be approximately 90° (FIG. 2A).

Also, as illustrated in FIG. 2, third sine bridge 224 is disposed along a fifth axis 260 and third cosine bridge 226 is disposed along a sixth axis 262. In an embodiment, an angle 261 between fifth axis 260 and sixth axis 262 may be approximately 90° (FIG. 2A). Fourth sine bridge 234 is disposed along a seventh axis 264 and fourth cosine bridge 236 is disposed along an eighth axis 268. In an embodiment, an angle 265 between seventh axis 264 and eighth axis 266 may be approximately 90° (FIG. 2A).

The different bridge structures can be titled at various tilt angles with respect to each other. For example, and as illustrated in FIG. 2B considering the sine bridge of each bridge structure, third axis 254 can be disposed at a first tilt angle 253 with respect to first axis 250. Fourth axis 258 can be disposed at a second tilt angle 257 with respect to second axis 252. Seventh axis 264 can be disposed at a third tilt angle 263 with respect to fifth axis 260. Eighth axis 268 can be disposed at a fourth tilt angle 267 with respect to sixth axis 262. In an embodiment, first, second, third and fourth tilt angles 253, 257, 263, 267 may be different. In some embodiments, one or more of first, second, third and fourth tilt angles 253, 257, 263, 267 may be the same. In some embodiments, the fifth axis 260 can be disposed a fifth tilt angle 269 with respect to first axis 250. It should be appreciated that the tilt angle between axes of different bridge structures can include any angle between about −90° to about 90°.

The first, second, third and fourth tilt angles 253, 257, 263, 267 can be factors of approximately 90° and/or factors of approximately 45°. In some embodiments, the first, second, third and fourth tilt angles 253, 257, 263, 267 can be selected such that an error percentage of first, second, third, and fourth bridge structures 202, 212, 222, 232 are opposite.

The first, second, third and fourth tilt angles 253, 257, 263, 267 can be selected such that each of the different axes first, second, third and fourth bridge structures 202, 212, 222, 232 are evenly spaced. For example, the different axes of second, third and fourth bridge structures 212, 222, 232 can tilted with respect to first bridge structure 202. The different tilt angles can be factor or multiples of each other. In such an embodiment, a first tilt angle between axes of second bridge structure 212 and first bridge structure 202 can be approximately 45°, a second tilt angle between axes of third bridge structure 222 and first bridge structure 202 can be approximately 22.5° and a third tilt angle between axes of fourth bridge structure 232 and first bridge structure 202 can be approximately 67.5°.

It should be appreciated that the tilt angle between axes of different bridge structures can be selected based at least on a particular application of the angle sensor. In some embodiments, the tilt angle between axes of different bridge structures can be selected using an iterative method. For example, a first bridge structure can be generated having a cosine bridge and a sine bridge disposed at approximately 90° with respect to each other. Then each subsequent bridge structure can include a cosine bridge and a sine bridge disposed at approximately 90° and each subsequent bridge structure can be tilted at a tilt angle with respect to the first bridge structure or any other bridge structure in the respective angle sensor. Thus, the cosine bridges of each subsequent bridge structure can be titled with respect to the cosine bridge of the first bridge structure and sine bridges of each subsequent bridge structure can be titled with respect to the sine bridge of the first bridge structure. In some embodiments, an angle sensor can include one or more groups of bridge structures with each group of bridge structures having two or more bridge structures.

Each of first, second, third and fourth bridge structures 202, 212, 222, 232 include a plurality of magnetoresistance elements. For example, and as illustrated in FIG. 2, the first sine bridge 204 includes a plurality of magnetoresistance elements 208a-208d, the first cosine bridge 206 includes a plurality of magnetoresistance elements 210a-210d, the second sine bridge 214 includes a plurality of magnetoresistance elements 218a-218d, and the second cosine bridge 216 includes a plurality of magnetoresistance elements 220a-220d. The third sine bridge 224 includes a plurality of magnetoresistance elements 228a-228d, the third cosine bridge 226 includes a plurality of magnetoresistance elements 230a-230d, the fourth sine bridge 234 includes a plurality of magnetoresistance elements 240a-240d, and the fourth cosine bridge 236 includes a plurality of magnetoresistance elements 238a-238d.

A first terminal of first sine bridge 204, first cosine bridge 206, second sine bridge 214, second cosine bridge 216, third sine bridge 224, third cosine bridge 226, fourth sine bridge 234, and fourth cosine bridge 236 can be coupled to a voltage supply terminal (e.g., Vcc) 272. A second terminal of first sine bridge 204, first cosine bridge 206, second sine bridge 214, second cosine bridge 216, third sine bridge 224, third cosine bridge 226, fourth sine bridge 234, and fourth cosine bridge 236 can be coupled to a ground terminal 274.

Figure 3:
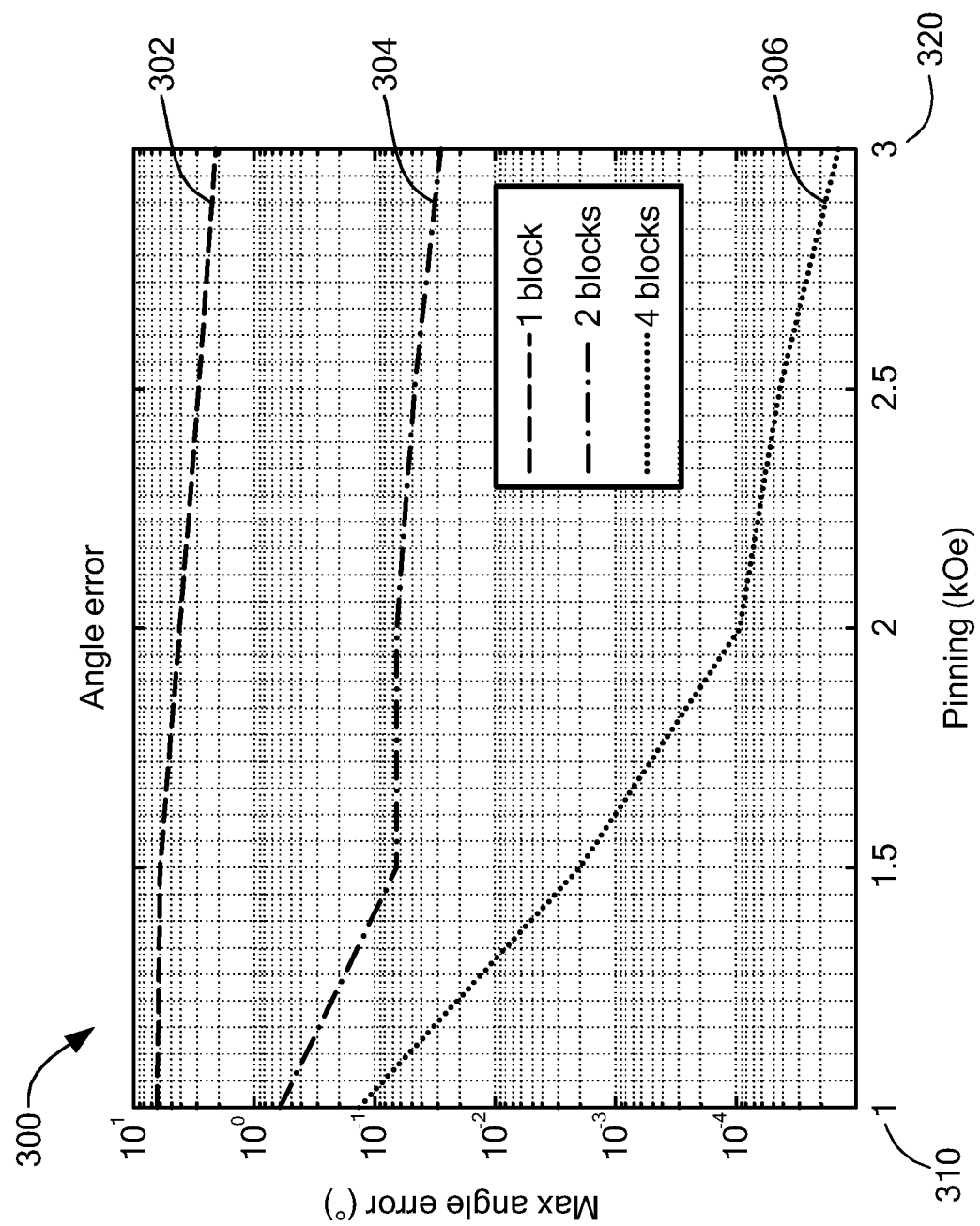
FIG. 3 is a plot showing angle error as a function of pinning strength for angle sensors having different numbers of bridge structures.

Now referring to FIG. 3, a plot 300 illustrates changes in angle error (e.g., absolute angle error) for an angle sensor as a pinning factor of a reference layer of the angle sensors changes for three different angle sensors 302, 304, 306, with the angle error values provided along the vertical axis (e.g., y-axis) and the pinning factor provided along the horizontal axis (e.g., x-axis) in kilo Oersted units (kOe). In particular, line 302 illustrates the angle error for an angle sensor having one bridge structure, line 304 illustrates the angle error for an angle sensor having two bridge structures (e.g., angle sensor 100 of FIG. 1) and line 306 illustrates the angle error for an angle sensor having four bridge structures (e.g., angle sensor 200 of FIG. 2).

As illustrated in FIG. 3, as the pinning factor increases, the absolute angle error decreases. Further, as the number of bridge structures within an angle sensor increases, the absolute angle error decreases. For example, line 302 corresponds to an angle sensor having one bridge structure. For line 302, as the pining factor increases from a first pinning factor value 310, here 1 kOe to a second pinning factor value 320, here 3 kOe, the angle error percentage decreases.

However, by increasing the number of bridge structures within the angle sensor, a greater decrease in absolute angle error for an angle sensor can be achieved. For example, line 304 corresponds to an angle sensor having two bridge structures. For line 304, at the first pinning factor value 310, here 1 kOe, the angle sensor having two bridge structures has a lower absolute angle as compared the angle sensor having one bridge structure represented by line 302. Further, as the pinning factor increases from the first pinning factor value 310, here 1 kOe to the second pinning factor value 320, here 3 kOe, line 304 (i.e., angle sensor having two bridge structures) experiences a greater decrease in the angle error as compared to the angle sensor having one bridge structure represented by line 302 (e.g., greater rate of change of line 304 as compared to line 302).

Line 306 corresponds to an angle sensor having four bridge structures and at the first pinning factor value 310, here 1 kOe, the angle sensor having four bridge structures has a lower absolute angle error as compared the angle sensor having two bridge structures (line 304) and/or the angle sensor having one bridge structure (line 302). Further, as the pinning factor increases from the first pinning factor value 310, here 1 kOe to the second pinning factor value 320, here 3 kOe, line 306 (i.e., angle sensor having four bridge structures) experiences a greater decrease in the angle error as compared to the angle sensor having two bridge structures represented by line 304 and/or the angle sensor having one bridge structure represented by line 302 (e.g., greater rate of change of line 306 as compared to lines 304 and 302). Therefore, by increasing a pinning factor of an angle sensor, increasing the number of bridge structures within an angle sensor or a combination of both, the angle error percentage for an angle sensor can be reduced.

Figure 4:
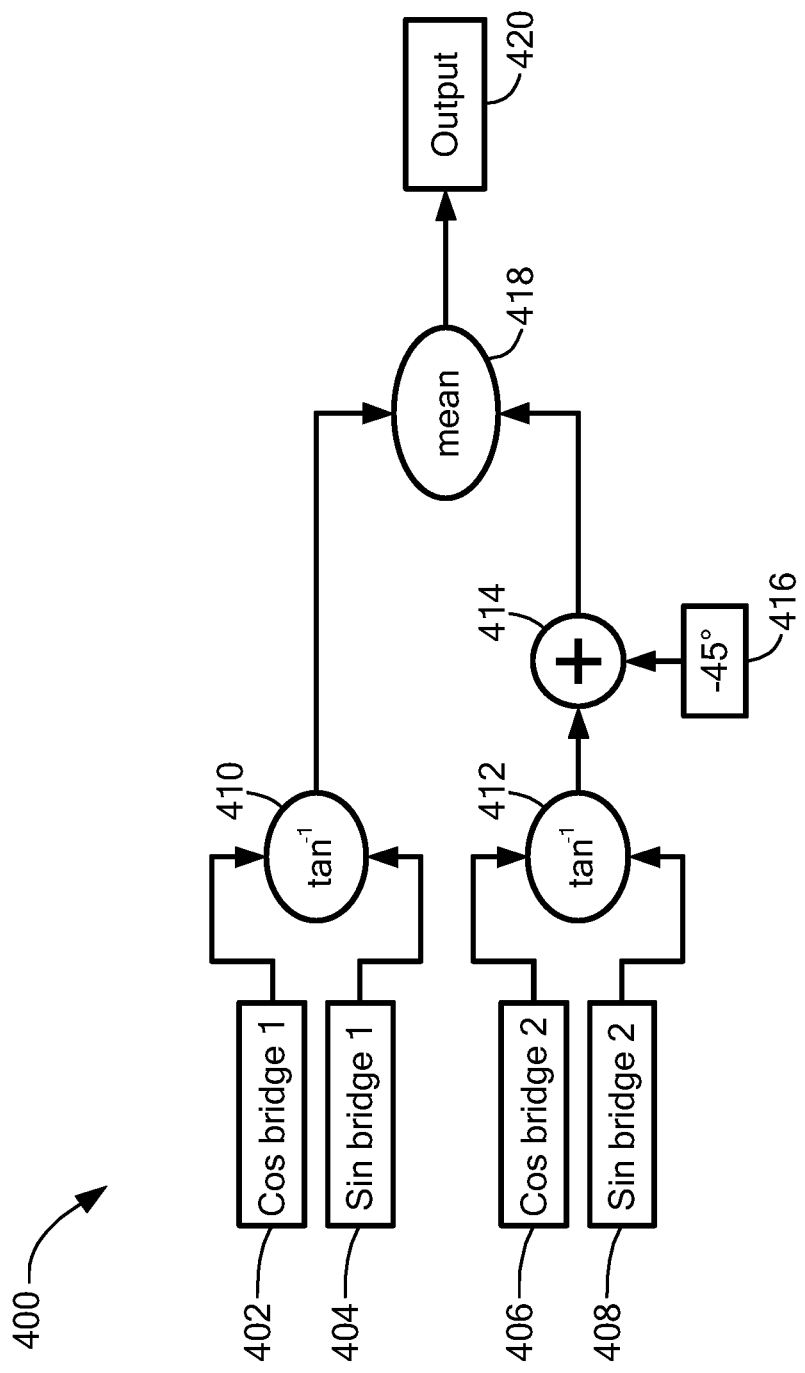
FIG. 4 is a block diagram illustrating angle sensor having two bridge structures.

Now referring to FIG. 4, a block diagram 400 includes a first cosine bridge module 402, a first sine bridge module 404, a second cosine bridge module 406 and a second sine bridge module 408. In an embodiment, first cosine bridge module 402, first sine bridge module 404, second cosine bridge module 406 and second sine bridge module 408 can correspond to the outputs of first cosine bridge 106, first sine bridge 104, second cosine bridge 114 and second sine bridge 114 of FIG. 1, respectively.

Circuit 400 can be coupled to or a component of angle sensor 100 of FIG. 0.1 and can be configured to process output signals (sinusoidal and cosinusoidal signals) generated by first and second bridge structures 102, 112 to generate an output signal indicative of a direction of magnetic field measured by first and second bridge structures 102, 112.

An output of first cosine bridge module 402 is coupled to a first input of a first arctangent module 410 and an output of first sine bridge module 404 is coupled to a second input of the first arctangent module 410. In an embodiment, the output of the first cosine bridge module 402 can be a first cosinusoidal signal and the output of first sine bridge module 404 can be a first sinusoidal signal. First arctangent module 410 can compute a first arctangent value based on the first sinusoidal signal and the first cosinusoidal signal.

An output of first arctangent module 410 is coupled to a first input of a summing module 418 to provide the first arctangent value.

An output of second cosine bridge module 406 is coupled to a first input of a second arctangent module 412 and an output of second sine bridge module 408 is coupled to a second input of the second arctangent module 412. In an embodiment, the output of the second cosine bridge module 404 can be a second cosinusoidal signal and the output of second sine bridge module 404 can be a second sinusoidal signal. Second arctangent module 412 can be compute a second arctangent value based on the second sinusoidal signal and the second cosinusoidal signal.

An output of second arctangent module 412 is coupled to a first input of a differencing element 414 to provide the second arctangent value. A second input of differencing element 414 is coupled to receive a tilt angle 416. The tilt angle 416 can be a positive or negative angle value.

The tilt angle 416 may correspond to an angle difference between a bridge or axis of a first bridge structure and a bridge or axis of a second bridge structure (or any other bridge structure in the respective angle sensor). For example, in an embodiment, the tilt angle 416 may correspond to the tilt angles 145, 149 that third and fourth axes 146, 148 of the second bridge structure 112 of FIG. 1 are tilted at with respect to the first and second axes 142, 144 of the first bridge structure 102 of FIG. 1, respectively. Stated differently, the tilt angle 416 can correspond to the first tilt angle 145 between first axis 142 and third axis 146 of FIG. 1 and/or a second tilt angle 149 between second axis 144 and fourth axis 148 of FIG. 1.

The differencing element 414 can apply the tilt angle value 416 to the second arctangent value to generate a differencing value (e.g., third arctangent value). In some embodiments, the differencing element 414 can subtract the tilt angle 416 from the second arctangent value to generate the differencing value. In other embodiments, the differencing element 414 can add a negative tilt angle 416 to the second arctangent value to generate the differencing value.

An output of the differencing element 414 can be coupled to a second input of the summing module 418. The summing module 418 can receive the first arctangent value and the differencing value (e.g., third arctangent value) and compute a mean value of the first arctangent value and the differencing value. The output of summing module 418 is an output signal 420 that is the determined mean value. In an embodiment, output signal 420 can be indicative of the direction of the magnetic field.

Figure 5:
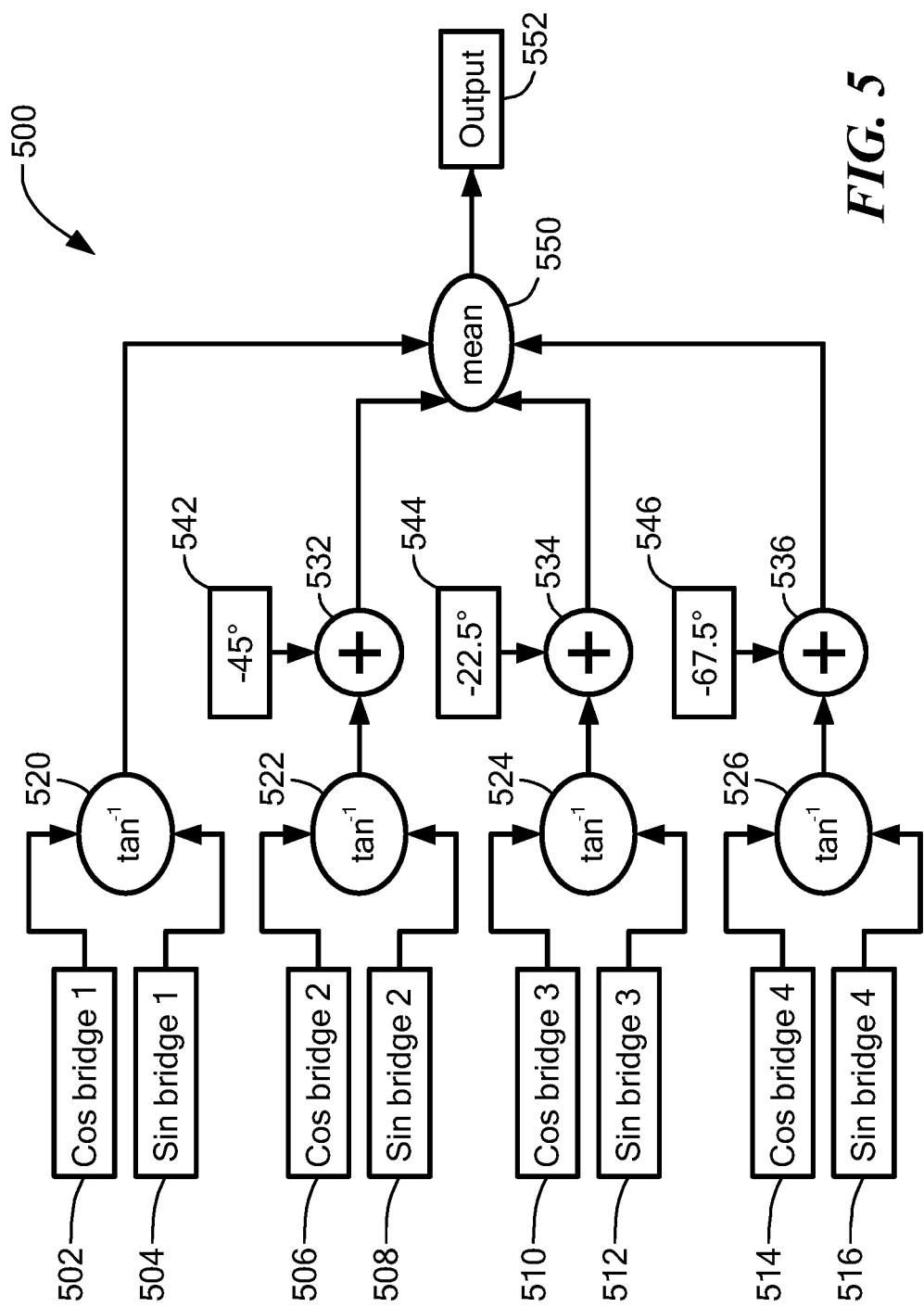
FIG. 5 is a block diagram illustrating angle sensor having four bridge structures.

Now referring to FIG. 5, a circuit 500 includes a first cosine bridge module 502 and a first sine bridge module 504 corresponding to outputs of a first bridge structure and a second cosine bridge module 506 and a second sine bridge module 508 corresponding to outputs of a second bridge structure. The circuit 500 further includes a third cosine bridge module 510 and a third sine bridge module 512 corresponding to outputs of a third bridge structure and a fourth cosine bridge module 514 and a fourth sine bridge module 516 corresponding to outputs of a fourth bridge structure.

Circuit 500 can be coupled to or a component of angle sensor 200 of FIG. 0.2 and can be configured to process output signals (sinusoidal and cosinusoidal signals) generated by first, second, third and fourth bridge structures 202, 212, 222, 232 to generate an output signal indicative of a direction of magnetic field measured by first, second, third and fourth bridge structures 202, 212, 222, 232.

In an embodiment, first cosine bridge module 502, first sine bridge module 504, second cosine bridge module 506 and second sine bridge module 508, third cosine bridge module 510, third sine bridge module 512, fourth cosine bridge module 514 and fourth sine bridge module 516 can correspond to the outputs of first cosine bridge 206, first sin bridge 204, second cosine bridge 216 and a second sine bridge 214, third cosine bridge 226, third sin bridge 224, fourth cosine bridge 236 and fourth sine bridge 234 of FIG. 2, respectively.

As illustrated in FIG. 5, an output of first cosine bridge module 502 is coupled to a first input of a first arctangent module 520 and an output of first sine bridge module 504 is coupled to a second input of the first arctangent module 520. In an embodiment, the output of the first cosine bridge module 502 can be a first cosinusoidal signal and the output of first sine bridge module 504 can be a first sinusoidal signal. First arctangent module 520 can be compute a first arctangent value based on the first sinusoidal signal and the first cosinusoidal signal.

An output of first arctangent module 520 is coupled to a first input of a summing module 550 to provide the first arctangent value.

An output of second cosine bridge module 506 is coupled to a first input of a second arctangent module 522 and an output of second sine bridge module 508 is coupled to a second input of the second arctangent module 522. In an embodiment, the output of the second cosine bridge module 506 can be a second cosinusoidal signal and the output of second sine bridge module 508 can be a second sinusoidal signal. Second arctangent module 522 can compute a second arctangent value based on the second sinusoidal signal and the second cosinusoidal signal.

An output of second arctangent module 522 is coupled to a first input of a first differencing element 532 to provide the second arctangent value. A second input of first differencing element 532 is coupled to receive a first tilt angle 542. The first tilt angle 542 can be a positive or negative angle value.

The first, second, and third tilt angles 542, 544, 546 may correspond to the tilt angles between bridges or axes of different bridge structures (e.g., tilt angles 253, 257, 263, 267 of FIG. 2B). For example, first tilt angle 542 can correspond to an angle difference between a bridge or an axis of the first bridge structure and a bridge or axis of the second bridge structure (or any other bridge structure). In an embodiment, the first tilt angle 542 may correspond to the angles that third and fourth axes 254, 258 of the second bridge structure 212 of FIG. 2 are tilted at with respect to the first and second axes 250, 252 of the first bridge structure 202 of FIG. 2, respectively. Stated differently, the first tilt angle 542 can correspond to an angle between first axis 250 and third axis 254 of FIG. 2 and/or an angle between second axis 252 and fourth axis 258 of FIG. 2. Second and third tilt angle 544, 546 will be described in greater detail below.

The first differencing element 532 can apply the first tilt angle 542 to the second arctangent value to generate a first differencing value. In some embodiments, the first differencing element 532 can subtract the first tilt angle 542 from the second arctangent value to generate the first differencing value. In other embodiments, the first differencing element 532 can add a negative first tilt angle 542 to the second arctangent value to generate the first differencing value.

An output of the first differencing element 532 can be coupled to a second input of the summing module 550.

An output of third cosine bridge module 510 is coupled to a first input of a third arctangent module 524 and an output of third sine bridge module 512 is coupled to a second input of the third arctangent module 524. In an embodiment, the output of the third cosine bridge module 510 can be a third cosinusoidal signal and the output of third sine bridge module 512 can be a third sinusoidal signal. Third arctangent module 524 can be compute a third arctangent value based on the third sinusoidal signal and the third cosinusoidal signal.

An output of third arctangent module 524 is coupled to a first input of a second differencing element 534 to provide the third arctangent value. A second input of second differencing element 534 is coupled to receive a second tilt angle 544. The second tilt angle 544 can be a positive or negative angle value.

Second tilt angle 544 can correspond to an angle difference between a bridge or an axis of the first bridge structure and a bridge or axis of the third bridge structure (or any other bridge structure). In an embodiment, the second tilt angle 542 may correspond to the angles that fifth and sixth axes 260, 262 of the third bridge structure 222 of FIG. 2 are tilted at with respect to the first and second axes 250, 252 of the first bridge structure 202 of FIG. 2, respectively. Stated differently, the second tilt angle value 544 can correspond to an angle between first axis 250 and fifth axis 260 of FIG. 2 and/or an angle between second axis 252 and sixth axis 262 of FIG. 2.

The second differencing element 534 can apply the second tilt angle 544 to the third arctangent value to generate a second differencing value. In some embodiments, the second differencing element 534 can subtract the second tilt angle 544 from the third arctangent value to generate the second differencing value. In other embodiments, the second differencing element 534 can add a negative second tilt angle 544 to the third arctangent value to generate the second differencing value.

An output of the second differencing element 534 can be coupled to a third input of the summing module 550.

An output of fourth cosine bridge module 514 is coupled to a first input of a fourth arctangent module 526 and an output of fourth sine bridge module 516 is coupled to a second input of the fourth arctangent module 526. In an embodiment, the output of the fourth cosine bridge module 514 can be a fourth cosinusoidal signal and the output of fourth sine bridge module 516 can be a fourth sinusoidal signal. Fourth arctangent module 526 can compute a fourth arctangent value based on the fourth sinusoidal signal and the fourth cosinusoidal signal.

An output of fourth arctangent module 526 is coupled to a first input of a third differencing element 536 to provide the fourth arctangent value. A second input of third differencing element 536 is coupled to receive a third tilt angle 546. The third tilt angle value 546 can be a positive or negative angle value.

Third tilt angle 546 can correspond to an angle difference between a bridge or an axis of the first bridge structure and a bridge or axis of the fourth bridge structure (or any other bridge structure). In an embodiment, the third tilt angle 546 may correspond to the angles that seventh and eighth axes 264, 268 of the fourth bridge structure 232 of FIG. 2 are tilted at with respect to the first and second axes 250, 252 of the first bridge structure 202 of FIG. 2, respectively. Stated differently, the third tilt angle 546 can correspond to an angle between first axis 250 and seventh axis 264 of FIG. 2 and/or an angle between second axis 252 and eighth axis 268 of FIG. 2. In some embodiments, third tilt angle 546 can be equal to the combination of the first tilt angle 542 and the second tilt angle 544.

The third differencing element 536 can apply the third tilt angle 546 to the fourth arctangent value to generate a third differencing value. In some embodiments, the third differencing element 536 can subtract the third tilt angle 546 from the fourth arctangent value to generate the third differencing value. In other embodiments, the third differencing element 536 can add a negative third tilt angle 546 to the fourth arctangent value to generate the third differencing value.

An output of the third differencing element 536 can be coupled to a fourth input of the summing module 550.

The summing module 550 can receive the first arctangent value, and the first, second and third differencing values and compute a mean value of the first arctangent value, and the first, second and third differencing values. In an embodiment, the mean value can correspond to the direction of the magnetic field. Thus, the output of summing module 550 is an output signal 552 that is indicative of the direction of the magnetic field.

Figure 6:
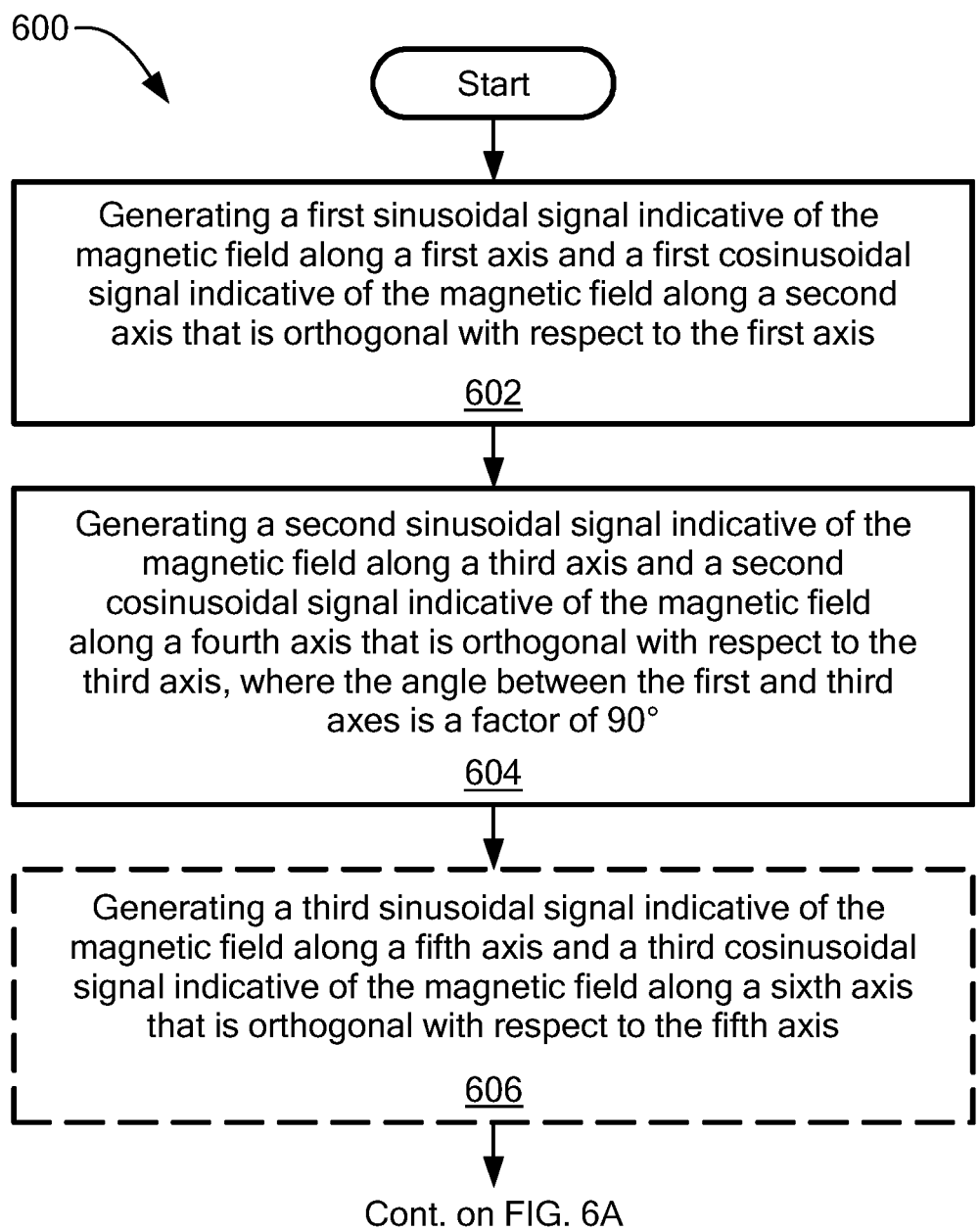
FIG. 6 and FIG. 6A are a flow diagram of a method for detecting a direction of a magnetic field.
Figure 6A:
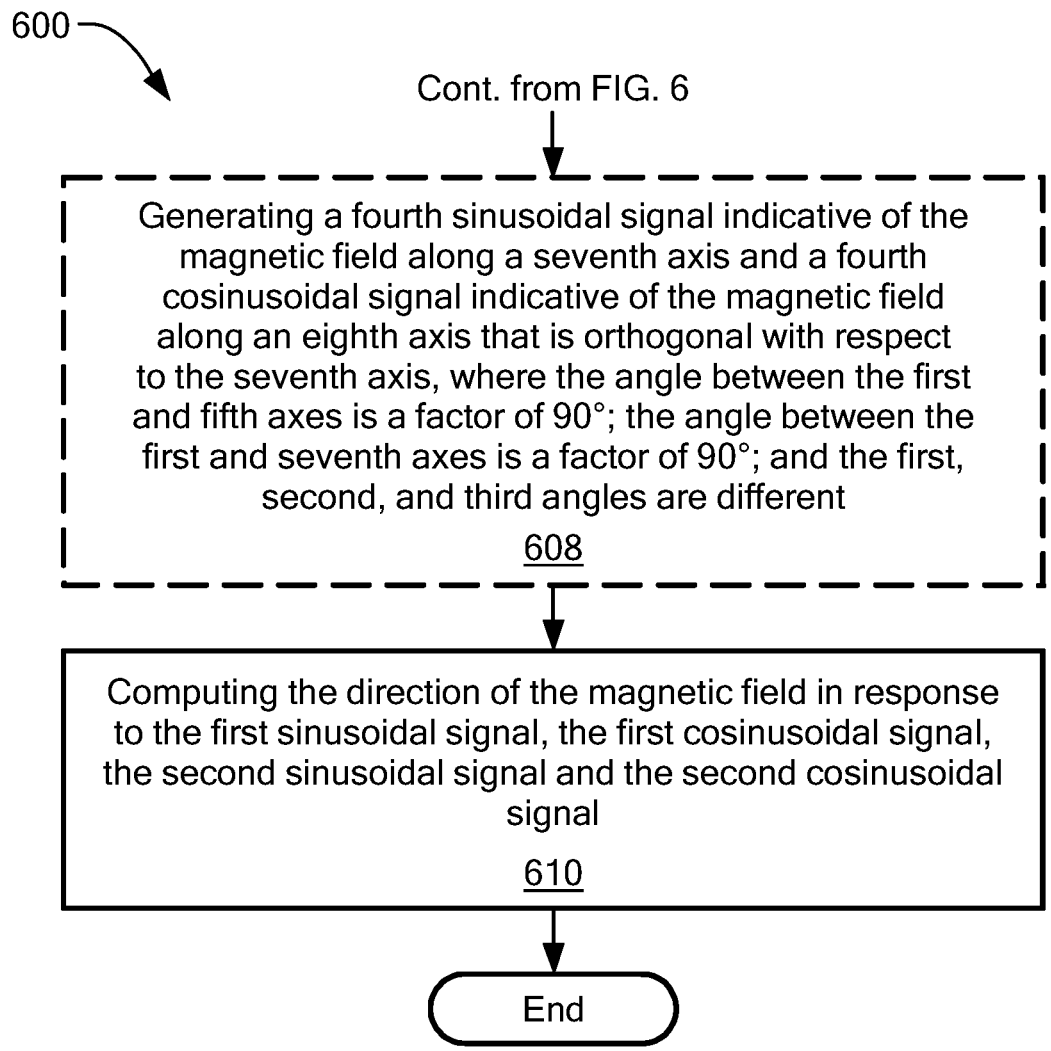

Now referring to FIG. 6, a method 600 for detecting a direction of a magnetic field begins at block 602, by generating a first sinusoidal signal indicative of the magnetic field along a first axis and a first cosinusoidal signal indicative of the magnetic field along a second axis. In an embodiment, the first axis can be orthogonal with respect to the second axis. For example, an angle between the first axis and the second axis can be approximately 90°.

At block 604, a second sinusoidal signal indicative of the magnetic field along a third axis and a second cosinusoidal signal indicative of the magnetic field along a fourth axis can be generated. In an embodiment, the third axis can be orthogonal with respect to the fourth axis. For example, an angle between the third axis and the fourth axis can be approximately 90°.

The angle sensor can include a plurality of bridge structures having one or more magnetoresistance elements that are oriented to sense the magnetic field along different axes. In an embodiment, each bridge structure can be configured to measure properties of the magnetic field along at least two different axes.

The angle sensor can include a first bridge structure and a second bridge structure. The first bridge structure can include a first sine bridge disposed relative to or along the first axis and a first cosine bridge disposed relative to or along the second axis. The second bridge structure can include a second sine bridge disposed relative to or along the third axis and a second cosine bridge disposed relative to or along the fourth axis.

The first sine bridge, first cosine bridge, second sine bridge and second cosine bridge can include a plurality of magnetoresistance elements to sense properties of the magnetic field. The plurality of magnetoresistance elements can be disposed relative to an axis. For example, the first sine bridge can include a first plurality of magnetoresistance elements disposed relative to the first axis, the first cosine bridge can include a second plurality of magnetoresistance elements disposed relative to the second axis, the second sine bridge can include a third plurality of magnetoresistance elements disposed relative to the third axis, and the second cosine bridge can include a fourth plurality of magnetoresistance elements disposed relative to the fourth axis.

Each bridge structure can include a sine bridge and a cosine bridge disposed orthogonal with respect to each other (e.g., an angle between the sine bridge and cosine bridge is approximately 90°). Thus, the first axis can be orthogonal with respect to the second axis and the third axis can be orthogonal with respect to the fourth axis.

The axes of different bridge structures can be disposed at different angles (e.g., tilt angles) relative to each other to sense the magnetic field at different angles. By measuring the magnetic field at different angles, an angle error of the angle sensor can be reduced. For example, the angle error of each bridge structure can be periodic. However, the angle error of the first bridge structure can be opposite the angle error of the second bridge structure based in part on an angle of tilt between their respective axes. The angle error of the respective bridges can cancel or otherwise reduce an overall angle error percentage of the angle sensor when averaged or combined together. Thus, by measuring the magnetic field at different angles, an angle sensor having multiple bridge structures can reduce its respective angle error by a factor associated with the number of bridge structures.

At block 606, a third sinusoidal signal indicative of the magnetic field along a fifth axis and a third cosinusoidal signal indicative of the magnetic field along a sixth axis can be generated. In an embodiment, the fifth axis can be orthogonal with respect to the sixth axis. For example, an angle between the fifth axis and the sixth axis can be approximately 90°.

At block 608, a fourth sinusoidal signal indicative of the magnetic field along a seventh axis and a fourth cosinusoidal signal indicative of the magnetic field along an eighth axis can be generated. In an embodiment, the seventh axis can be orthogonal with respect to the eighth axis. For example, an angle between the seventh axis and the eighth axis can be approximately 90°.

It should be appreciated that the angle sensors described herein may include any number of bridge structures. For example, the angle sensors described herein may include two bridge structures, four bridge structures or more than four bridge structures. The number of bridge structures in an angle sensor can be selected based at least in part on a particular application of the angle sensor. For example, blocks 606 and 608 of method 600 may be optional. In some embodiments, blocks 606 and/or 608 may be included in method 600. However, in other embodiments, method 600 may include blocks 602, 604 and 610, and thus not include one or more of blocks 606 and 608.

The axis that a respective bridge is positioned along can be disposed at a variety of different angles with respect to each other. For example, bridges and axes within the same bridge structure (e.g., first sine bridge and first cosine bridge of the first bridge structure) can be disposed such that they are orthogonal to each other. In an embodiment, an angle between a sine bridge and a cosine bridge of the same bridge structure can be approximately 90°.

Bridges and axes of different bridge structures can be disposed with respect to each other at a variety of different tilt angles. A tilt angle may refer to an axis of a first bridge structure and an axis of a second, different bridge structure and/or an angle between a sine bridge of a first bridge structure and a sine bridge of a second, different bridge structure. In some embodiments, the tilt angle can include factors of approximately 90°, such as but not limited to, approximately 90°, approximately 45°, approximately 22.5°, and approximately 11.25°.

The bridges and axes of different bridge structures can be positioned such that they are evenly spaced in terms of the tilt angle with respect to each other. For example, in an angle sensor having four bridge structures, a tilt angle between the different bridges (and axes) of the four different bridge structures can include factors of approximately 22.5°. In such an embodiment, a tilt angle between a first sine bridge (of first axis) of a first bridge structure and a second sine bridge (or third axis) of a second bridge structure can be approximately 45°, a tilt angle between the first sine bridge (of first axis) of a first bridge structure and a third sine bridge (or fifth axis) of a third bridge structure can be approximately 22.5°, and a tilt angle between the first sine bridge (of first axis) of a first bridge structure and a fourth sine bridge (or seventh axis) of a fourth bridge structure can be approximately 67.5°. It should be appreciated that the tilt angle between axes of different bridge structures can be selected based at least in part on the particular application of an angle sensor and the tilt angles may include any angle between about −90° to about 90°.

The tilt angle can be selected based at least in part on the number of bridge structures in the particular angle sensor and a desired angle error reduction.

In some embodiments, a pinning factor of a reference layer of the respective angle sensor can be modified or the reference layer can be formed having a predetermined pinning factor of the reference layer. For example, an absolute angle error for an angle sensor can be reduced by increasing a pinning factor of a reference layer of the respective angle sensor. As the pinning factor of the reference layer of the respective angle sensor is increased, the absolute angle error can be correspondingly reduced (see FIG. 3). The pinning factor can be measured in kilo Oersted units (kOe).

For example, each bridge structure described here can include a plurality of magnetoresistance elements. Each of the magnetoresistance elements can include a reference layer and a free layer. A pinning (or pinning factor) of the reference layer can range from about 1 kOe to about 3 kOe. In some embodiments, a pinning (or pinning factor) of the reference layer can range from about 1.2 kOe to about 2.5 kOe. It should be appreciated however that the pinning (or pinning factor) of the reference layer can vary based at least in part on an application of the angle sensor. For example, in some embodiments, the pinning (or pinning factor) of the reference layer can be less than 1 kOe or greater than 3 kOe.

The properties of one or more layers of a magnetoresistance element making up one or more bridges of a bridge structure can be modified to increase the layers respective pinning factor. In some embodiments, properties of one or more layers of a magnetoresistance element making multiple bridges and/or multiple bridge structure can be modified to increase the layers respective pinning factor. For example, a shape and/or thickness of the respective layer can be modified to increase the layers respective pinning factor.

The pinning factor can be modified (or generated) by at least two different techniques. In some embodiments, the pinning factor can be modified (or generated) using synthetic antiferromagnet (SAF). In other embodiments, the pinning factor can be modified (or generated) by modifying the pinning between a pinned layer and a pinning layer. For example, to increase the pinning factor between the pinned layer and the pinning layer, the coupling between the pinned layer and the pinned layer can be strengthened by reducing the thickness of a spacer layer disposed proximate to the pinned layer and distal from the pinning layer or by changing the material of the respective spacer layer. In some embodiments, the surface of the substrate that a magnetic field sensing element is disposed upon can be smoothed out or a roughness of the surface of the substrate can be reduced such that additional coupling can counteract the coupling through the spacer layer. The thickness and magnetization of the pinned layer and a second, different pinned layer (separated from the first pinned layer by the spacer layer) can be balanced to balance the SAF such that the magnetic field (e.g., magnetic field flux lines) emitted by first pinned layer can be compensated by the second pinned layer. In some embodiments, the thickness of the pinning layer can be increased to strengthen the anisotropy of the pinning layer.

The pinning factor of one or more layers of a magnetoresistance element making up one or bridges of a bridge structure can be selected based at least in part on a desired angle error reduction.

In some embodiments, the number of bridge structures and/or the pinning factor of a reference layer of one or more of the bridge structures of a particular angle sensor can be increased to reduce absolute angle error of the respective angle sensor. For example, as the pinning factor increases, the absolute angle error decreases. Further, as the number of bridge structures within an angle sensor increases, the absolute angle error decreases. Therefore, by increasing a pinning factor of an angle sensor, increasing the number of bridge structures within an angle sensor or a combination of both, the angle error can be reduced.

At block 610, the direction of the magnetic field can be computed in response to at least the first sinusoidal signal, the first cosinusoidal signal, the second sinusoidal signal, and the second cosinusoidal signal.

In an embodiment, the number of sinusoidal signals and cosinusoidal signals used to determine the direction of the magnetic field can correspond to the number of bridge structures of a particular angle sensor. For example, for an angle sensor having four bridge structures, the direction of the magnetic field can be computed in response to at least the first sinusoidal signal, the first cosinusoidal signal, the second sinusoidal signal, the second cosinusoidal signal, the third sinusoidal signal, the third cosinusoidal signal, the fourth sinusoidal signal, and the fourth cosinusoidal signal.

The angle sensor can be coupled to a circuit or the angle sensor can include a circuit (e.g., circuit 400 of FIG. 4, circuit 500 of FIG. 5) configured to determine the direction of the magnetic field using the sinusoidal signal(s) and cosinusoidal signal(s). The circuit can include one or more arctangent modules configured to generate arctangent values corresponding to the measured magnetic field using the corresponding sinusoidal signal and cosinusoidal signal.

The bridges of each bridge structure can be coupled to at least one arctangent module to provide their respective signals. For example, a sine bridge can be coupled to provide the sinusoidal signal to the arctangent module and a cosine bridge can be coupled to provide the cosinusoidal signal to the arctangent module. The arctangent module can generate an arctangent value corresponding to the measured magnetic field using the corresponding sinusoidal signal and cosinusoidal signal. The arctangent angle ($\varphi$) (or angle) from each bridge structure can be determined using the following formula:

$$\varphi = \tan^{-1}\left(\frac{U_S}{U_C}\right)$$

where $U_S$ corresponds to the sine of the measured magnetic field and the sinusoidal signal generated by the sine bridge and $U_C$ corresponds to the cosine of the measured magnetic field and the cosinusoidal signal generated by the cosine bridge.

The arctangent value angle ($\varphi$) can correspond to an angle of the measured magnetic field from a perspective of the particular bridge structure. In an embodiment, an arctangent value (angle ($\varphi$)) can be determined for each bridge structure.

The circuit can further include one or more differencing elements. The differencing elements can be coupled to outputs of the arctangent modules to generate an arctangent value (also referred to herein as a differencing value) for a bridge structure that has been tilted with respect to a first bridge structure. For example, the differencing element can be configured to apply a tilt angle between an axis of the first bridge structure and an axis of a different bridge structure (e.g., second bridge structure, third bridge structure, fourth bridge structure, etc.) to generate a differencing value. The tilt angle can be a positive or negative value. Thus, the differencing element can subtract the tilt angle from the respective arctangent value or add a negative tilt angle to the respective arctangent value. The tilt angle can vary as described above.

The output of the first arctangent module and the outputs of the one or more differencing elements can be coupled to inputs of a summing element of the circuit. In an embodiment, the summing element can determine a mean value of one or more arctangent values and/or one or more differencing values to generate an output signal indicative of the direction of the magnetic field.

For example, the summing element can determine a mean value ($\varphi_M$) using the following equation:

$$\varphi_M = \frac{1}{X}\sum_{x=1}^{X}\varphi_x - \theta_x$$

where angle $\varphi_x$ corresponds to the tilt angle value from the respective bridge structure (e.g., $\varphi_1$ corresponds to the tilt angle value from the first bridge structure, $\varphi_2$ corresponds to the tilt angle value from the second bridge structure, etc.). $\theta_x$ corresponds to the tilt angle between the first bridge structure and the respective other bridge structure ($\theta_1=0$), different from the first bridge structure. For example, $\theta_2$ corresponds to the tilt angle between the first bridge structure and the second bridge structure, $\theta_3$ corresponds to the tilt angle between the first bridge structure and the third bridge structure, and $\theta_4$ corresponds to the tilt angle between the first bridge structure and the fourth bridge structure.

X corresponds to the number of bridge structures in the respective angle sensor. For example, for an angle sensor having two bridge structures, the value of X is equal to two.

The determined mean value ($\varphi_M$) can correspond to the direction of the magnetic field and include a reduced angle error percentage corresponding to the number of bridge structures used to generate the respective mean value ($\varphi_M$).

Figure 7:
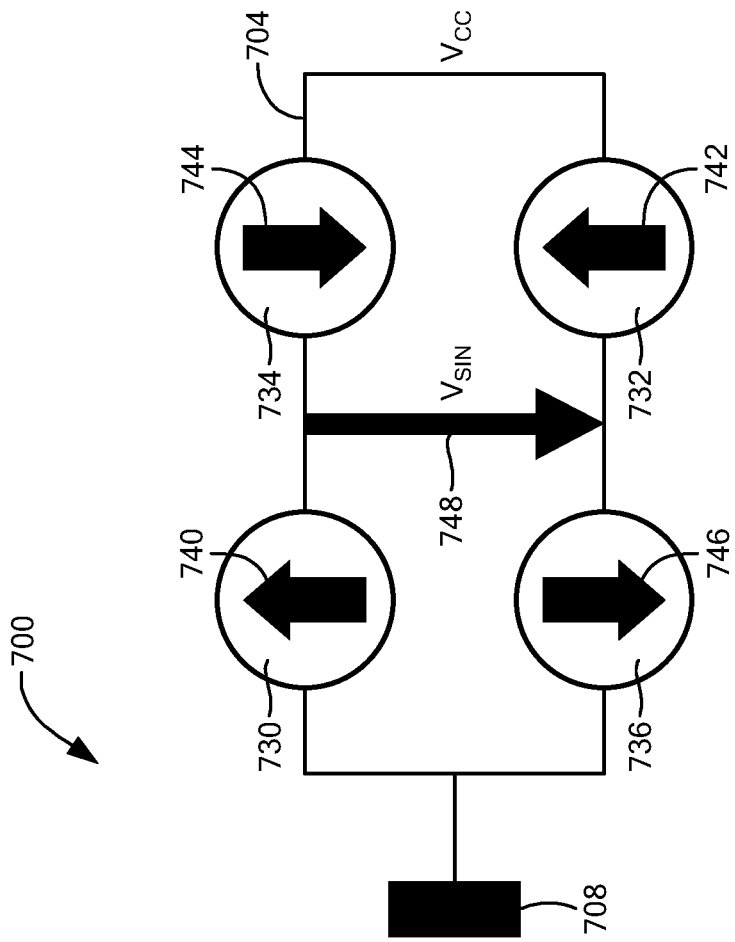
FIG. 7 is a diagram of an example of a bridge structure used in an angle sensor having a cosine bridge and a sine bridge.
Figure 7:
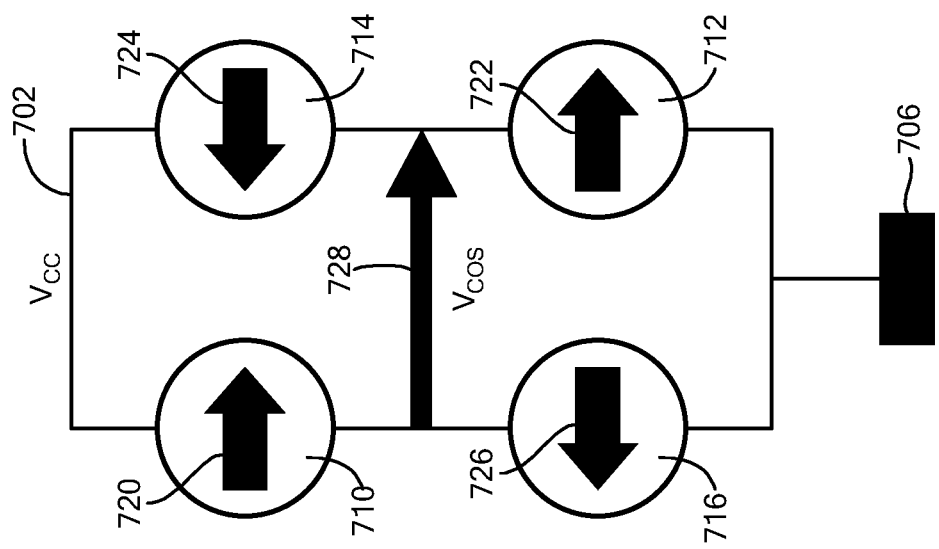

Referring to FIG. 7, an example of a bridge used in a magnetic field angle sensor is a bridge 700. In one example, the bridge 700 includes a cosine bridge 702 and a sine bridge 704.

The cosine bridge 702 generates a cosinusoidal signal, $V_{COS}$ 728, indicative of a cosine of an angle of a measured magnetic field. The cosine bridge 702 includes, for example, an MR element 710, an MR element 712, an MR element 714 and an MR element 716.

Each MR element 710-716 includes a reference direction. For example, the MR element 710 includes a reference direction 720, the MR element 712 includes a reference direction 722, the MR element 714 includes a reference direction 724 and the MR element 716 includes a reference direction 726. In one example, the reference direction 720 and the reference direction 722 are in the same direction. In one example, the reference direction 720 is opposite (i.e., by 180°) from the reference direction 724 and the reference direction 726.

The MR elements 710 and 714 are coupled to a voltage supply, $V_{CC}$. The MR elements 712 and 716 are coupled to ground 706.

The sine bridge 704 generates a sinusoidal signal, $V_{SIN}$ 748, indicative of a sine of the angle of the measured magnetic field and is orthogonal to cosinusoidal signal, $V_{COS}$ 728. The sine bridge 704 includes, for example, an MR element 730, an MR element 732, an MR element 734 and an MR element 736.

Each MR element 730-736 includes a reference direction. For example, the MR element 730 includes a reference direction 740, the MR element 732 includes a reference direction 742, the MR element 734 includes a reference direction 744 and the MR element 736 includes a reference direction 746. In one example, the reference direction 740 and the reference direction 742 are in the same direction. In one example, the reference direction 740 is opposite (i.e., by 180°) from the reference direction 744 and the reference direction 746.

The MR elements 732 and 734 are coupled to the voltage supply, $V_{CC}$. The MR elements 730 and 736 are coupled to ground 708.

Figure 8:
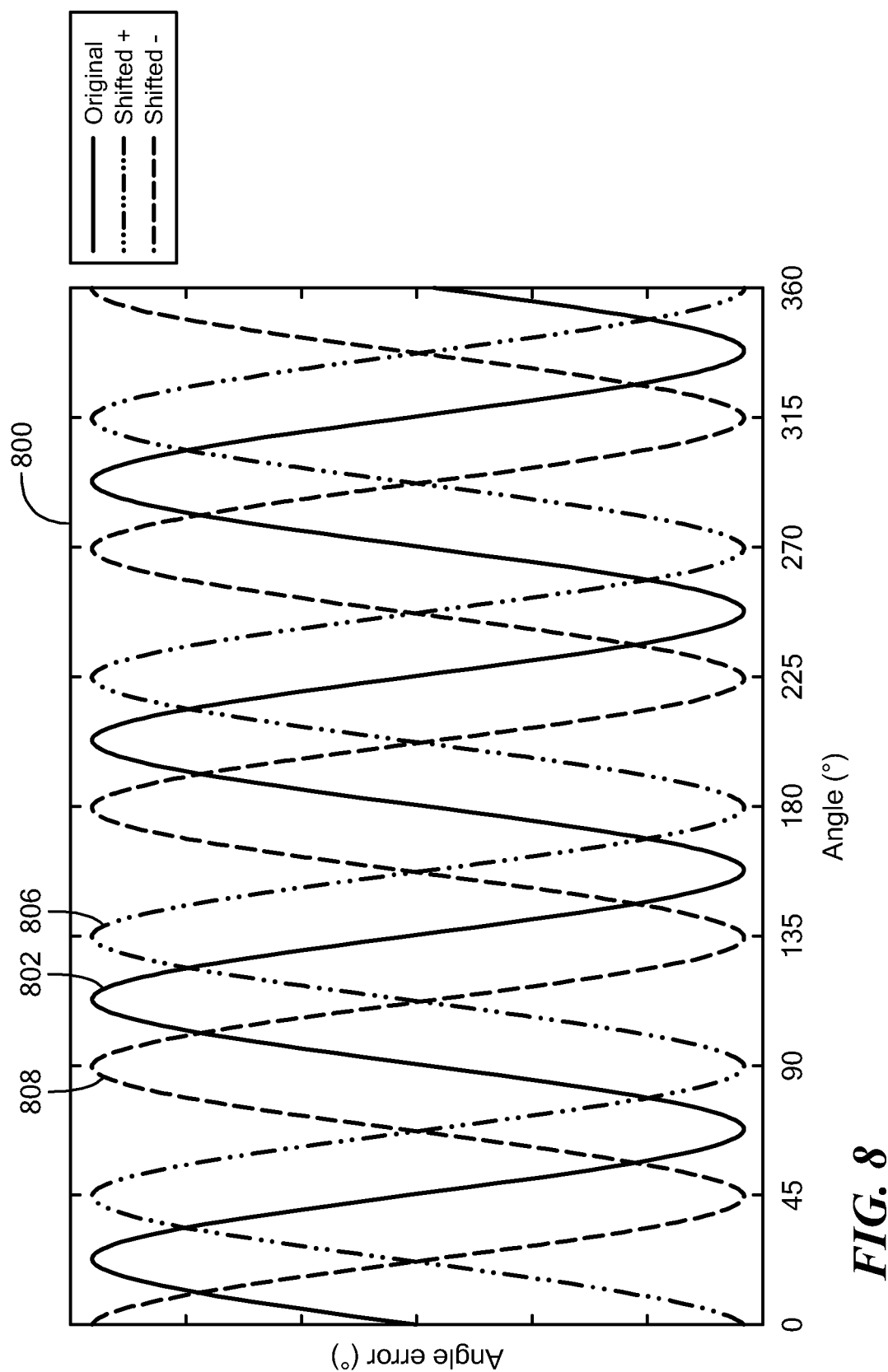
FIG. 8 is a graph of angle error versus angle of a magnetoresistance (MR) element.
Figure 9:
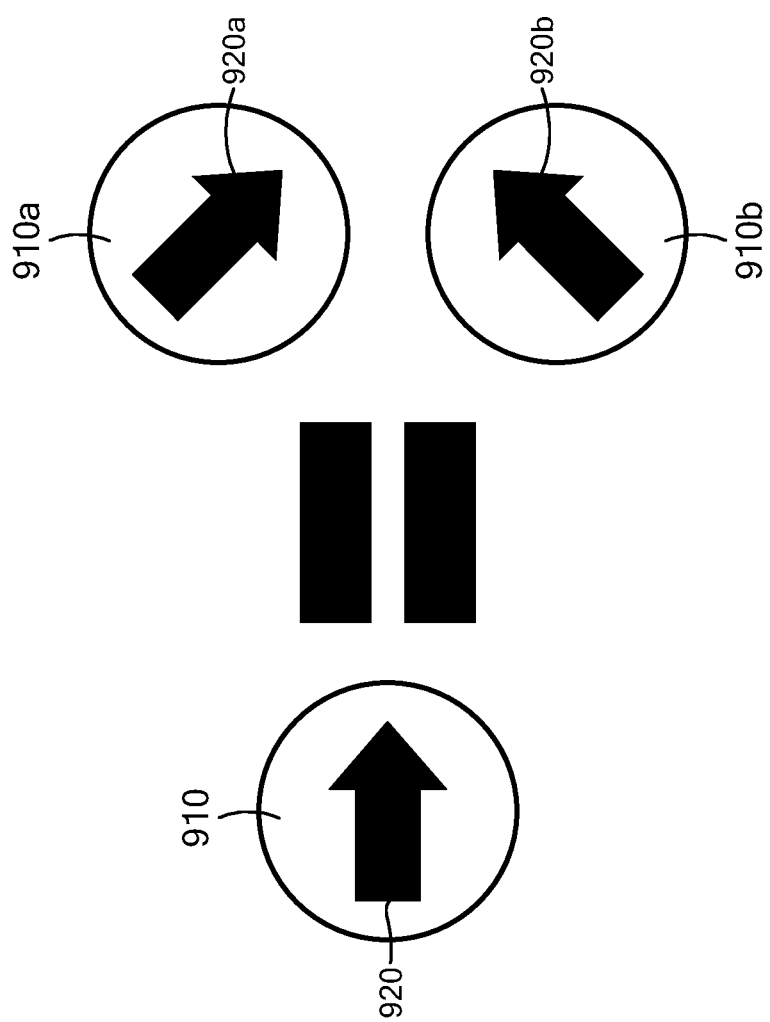
FIG. 9 is a diagram of a MR element being replaced by two MR elements.

Referring to FIGS. 8 and 9, a graph 800 depicts a curve 802 of the angle error versus angle for an MR element. In one example, the curve 802 is a harmonic error. One technique to reduce the angle error of the single MR element is to replace the single MR element with at least two MR elements.

In one particular example, the single MR element 910 is replaced by two MR elements 910a and 910b. The MR element 910 has a reference direction 920, the MR element 910a has a reference direction 920a and the MR element 910b has a reference direction 920b so that the average of the reference direction 920a and the reference direction 920b is equal to the reference direction 920. With the MR element 910a having the reference direction 920a the angle error versus angle curve becomes the curve 806 shifted by an angle $\varphi_C$ and with the MR element 910b having the reference direction 920b, the angle error versus angle curve becomes the curve 808 shifted by an angle $-\varphi_C$. Thus, by taking the average of the reference directions 920a, 920b the resultant error of each MR element 920a, 920b cancels the other out.

In the specific example depicted in FIG. 8, the angle $\varphi_C$ is 22.5° and the curve 802 depicts a fourth harmonic. However, the angle $\varphi_C$ may be other angles depending on the MR element, the number of harmonics to eliminate and/or depending on the application of the magnetic field angle sensor. In some examples, the angle $\varphi_C$ may be in a range from 20° to 400°. In one particular example, the angle $\varphi_C$ may be in a range from 25° to 370°.

In one specific example, an MR element may be replaced with three MR elements where a first MR element has a reference angle that is an adjusted angle, $\varphi_{adj}$, from the average reference angle of the three replacement MR elements; a second MR element has a reference angle that is $-\varphi_{adj}$ from the average reference angle of the three replacement elements; and a third MR element has a reference direction in a sensitive direction. The sensitive direction is an average reference direction of the first, second and third magnetoresistance elements. In one example, the third MR element has a resistance that is larger than the first and second MR elements. In one example, an adjusted angle, $\varphi_{adj}$, is between 0° and 90°.

Figure 10:
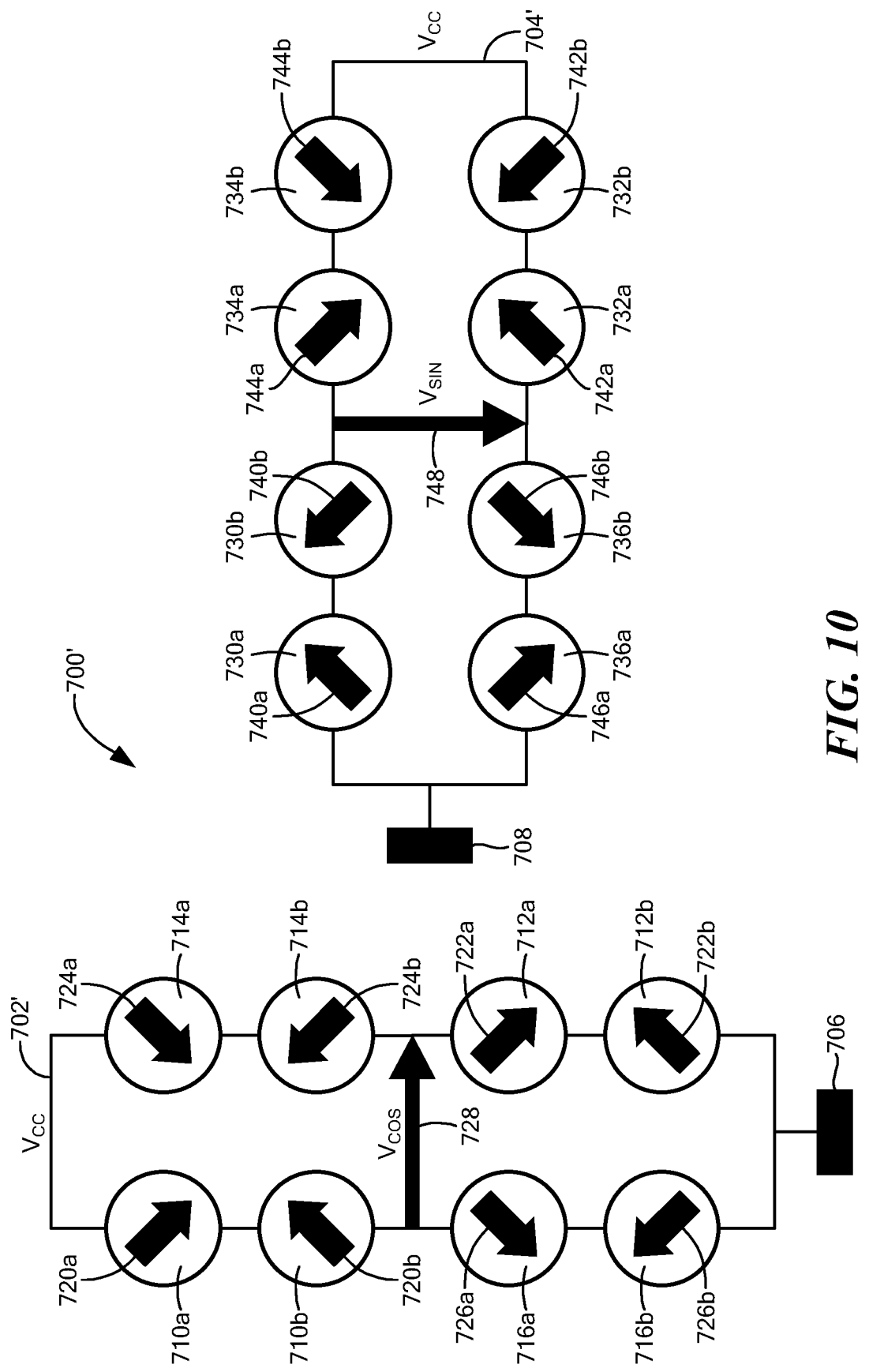
FIG. 10 is a diagram of an example MR elements of the bridge structure of FIG. 7 being replaced by MR elements in series.

Referring to FIGS. 7 and 10, a bridge 700' is an example of a bridge resulting from the replacement of the MR elements 710, 712, 714, 716, 730, 732, 734, 736 with equivalent MR elements in series. For example, in a cosine bridge 702', the MR element 710 has been replaced by an MR element 710a and an MR element 710b, the MR element 712 has been replaced by an MR element 712a and an MR element 712b, the MR element 714 has been replaced by an MR element 714a and an MR element 714b and the MR element 716 has been replaced by an MR element 716a and an MR element 716b.

The MR element 710a includes a reference direction 720a, the MR element 710b includes a reference direction 720b and the average of the reference direction 720a and the reference direction 720b is equal to the reference direction 720. The MR element 712a includes a reference direction 722a, the MR element 712b includes a reference direction 722b and the average of the reference direction 722a and the reference direction 722b is equal to the reference direction 722. The MR element 714a includes a reference direction 724a, the MR element 714b includes a reference direction 724b and the average of the reference direction 724a and the reference direction 724b is equal to the reference direction 724. The MR element 716a includes a reference direction 726a, the MR element 716b includes a reference direction 726b and the average of the reference direction 726a and the reference direction 726b is equal to the reference direction 726.

The replacement MR elements are added in series so that the sum of the resistance of both replacement MR elements equals the resistance of the MR element being replaced. For example, the resistance of the MR element 710a and the resistance of the MR element 710b is equal to the resistance of the MR element 710, the resistance of the MR element 712a and the resistance of the MR element 712b is equal to the resistance of the MR element 712, the resistance of the MR element 714a and the resistance of the MR element 714b is equal to the resistance of the MR element 714 and the resistance of the MR element 716a and the resistance of the MR element 716b is equal to the resistance of the MR element 716.

In a sine bridge 704', the MR element 730 has been replaced by an MR element 730a and an MR element 730b, the MR element 732 has been replaced by an MR element 732a and an MR element 732b, the MR element 714 has been replaced by an MR element 734a and an MR element 734b and the MR element 736 has been replaced by an MR element 736a and an MR element 736b.

The MR element 730a includes a reference direction 740a, the MR element 730b includes a reference direction 740b and the average of the reference direction 740a and the reference direction 740b is equal to the reference direction 740. The MR element 732a includes a reference direction 742a, the MR element 732b includes a reference direction 742b and the average of the reference direction 742a and the reference direction 742b is equal to the reference direction 742. The MR element 734a includes a reference direction 744a, the MR element 734b includes a reference direction 744b and the average of the reference direction 744a and the reference direction 744b is equal to the reference direction 744. The MR element 736a includes a reference direction 746a, the MR element 736b includes a reference direction 746b and the average of the reference direction 746a and the reference direction 746b is equal to the reference direction 746.

As described with respect to the cosine bridge 702', in the sine bridge 704', the replacement MR elements are added in series so that the sum of the resistance of both replacement MR elements equals the resistance of the MR element being replaced. For example, the resistance of the MR element 730a and the resistance of the MR element 730b is equal to the resistance of the MR element 730, the resistance of the MR element 732a and the resistance of the MR element 732b is equal to the resistance of the MR element 732, the resistance of the MR element 734a and the resistance of the MR element 734b is equal to the resistance of the MR element 734 and the resistance of the MR element 736a and the resistance of the MR element 736b is equal to the resistance of the MR element 736.

Figure 11:
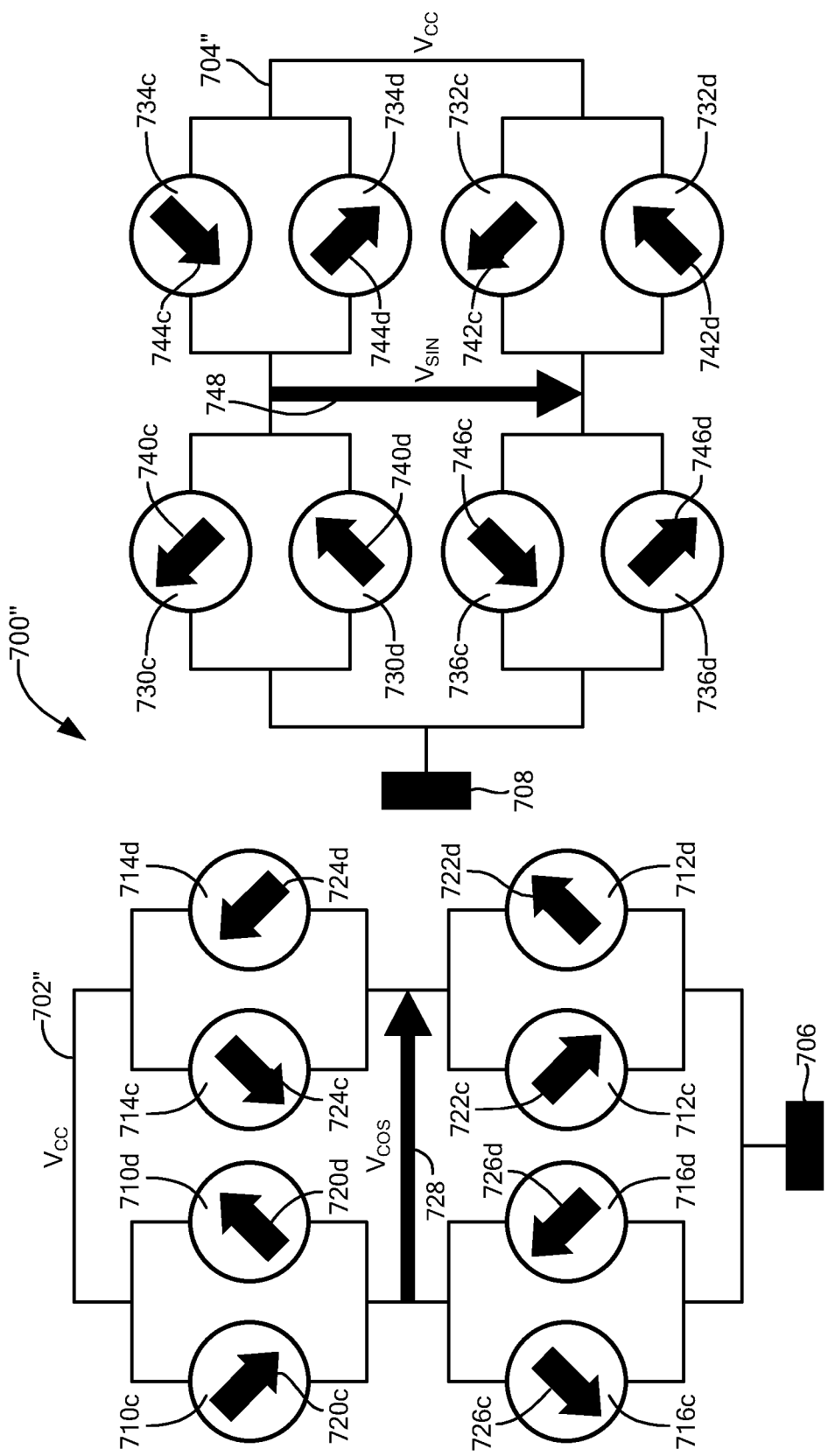
FIG. 11 is a diagram of an example MR elements of the bridge structure of FIG. 7 being replaced by MR elements in parallel.

Referring to FIGS. 7 and 11, a bridge 700" is an example of a bridge that results from replacing the MR elements 710, 712, 714, 716, 730, 732, 734, 736 with equivalent MR elements in parallel. For example, in a cosine bridge 702", the MR element 710 has been replaced by an MR element 710c and an MR element 710d, the MR element 712 has been replaced by an MR element 712c and an MR element 712d, the MR element 714 has been replaced by an MR element 714c and an MR element 714d and the MR element 716 has been replaced by an MR element 716c and an MR element 716d.

The MR element 710c includes a reference direction 720c, the MR element 710d includes a reference direction 720d and the average of the reference direction 720c and the reference direction 720d is equal to the reference direction 720. The MR element 712c includes a reference direction 722c, the MR element 712d includes a reference direction 722d and the average of the reference direction 722c and the reference direction 722d is equal to the reference direction 722. The MR element 714c includes a reference direction 724c, the MR element 714d includes a reference direction 724d and the average of the reference direction 724c and the reference direction 724d is equal to the reference direction 724. The MR element 716c includes a reference direction 726c, the MR element 716d includes a reference direction 726d and the average of the reference direction 726c and the reference direction 726d is equal to the reference direction 726.

The replacement MR elements are added in parallel so that the sum of the reciprocals of the resistance of both replacement MR elements equals the reciprocal of the resistance of the MR element being replaced. For example, a reciprocal of the resistance of the MR element 710c and a reciprocal of the resistance of the MR element 710d is equal to a reciprocal of the resistance of the MR element 710; a reciprocal of the resistance of the MR element 712c and a reciprocal of the resistance of the MR element 712d is equal to a reciprocal of the resistance of the MR element 712; a reciprocal of the resistance of the MR element 714c and a reciprocal of the resistance of the MR element 714d is equal to a reciprocal of the resistance of the MR element 714; and a reciprocal of the resistance of the MR element 716c and a reciprocal of the resistance of the MR element 716d is equal to a reciprocal of the resistance of the MR element 716.

In a sine bridge 704", the MR element 730 has been replaced by an MR element 730c and an MR element 730d, the MR element 732 has been replaced by an MR element 732c and an MR element 732d, the MR element 734 has been replaced by an MR element 734c and an MR element 734d and the MR element 736 has been replaced by an MR element 736c and an MR element 736d.

The MR element 730c includes a reference direction 740c, the MR element 730d includes a reference direction 740d and the average of the reference direction 740c and the reference direction 740d is equal to the reference direction 740. The MR element 732c includes a reference direction 742c, the MR element 732d includes a reference direction 742d and the average of the reference direction 742c and the reference direction 742d is equal to the reference direction 742. The MR element 734c includes a reference direction 744c, the MR element 734d includes a reference direction 744d and the average of the reference direction 744c and the reference direction 744d is equal to the reference direction 744. The MR element 736c includes a reference direction 746c, the MR element 736d includes a reference direction 746d and the average of the reference direction 746c and the reference direction 746d is equal to the reference direction 746.

As described with respect to the cosine bridge 702", in the sine bridge 704", the replacement MR elements are added in parallel so that the sum of the reciprocals of the resistance of both replacement MR elements equals the reciprocal of the resistance of the MR element being replaced. For example, a reciprocal of the resistance of the MR element 730c and a reciprocal of the resistance of the MR element 730d is equal to a reciprocal of the resistance of the MR element 730; a reciprocal of the resistance of the MR element 732c and a reciprocal of the resistance of the MR element 732d is equal to a reciprocal of the resistance of the MR element 732; a reciprocal of the resistance of the MR element 734c and a reciprocal of the resistance of the MR element 734d is equal to a reciprocal of the resistance of the MR element 734; and a reciprocal of the resistance of the MR element 736c and a reciprocal of the resistance of the MR element 736d is equal to a reciprocal of the resistance of the MR element 736.

Figure 12A:
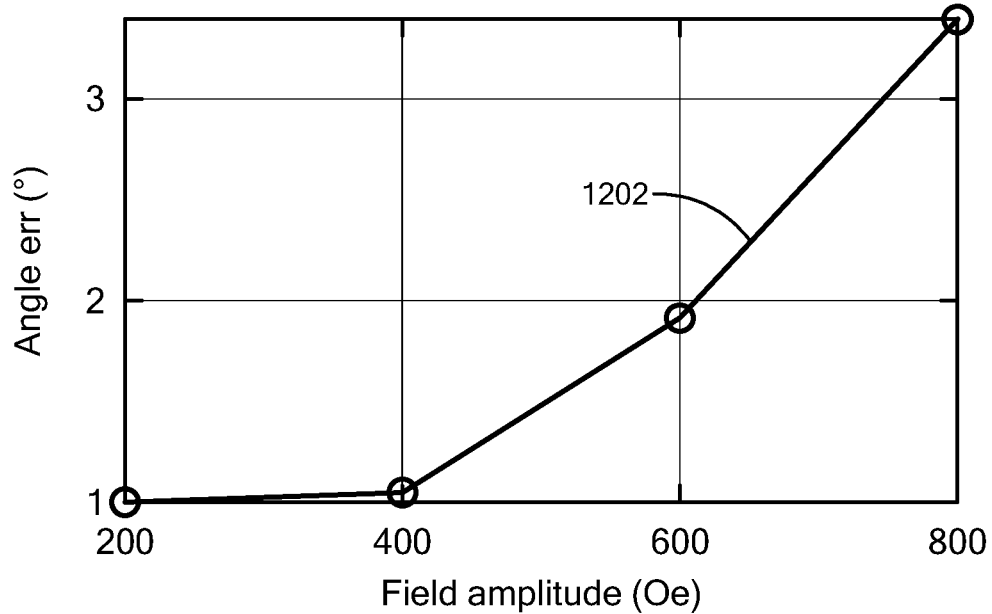
FIGS. 12A to 12C are graphs of angle error versus field amplitude for various bridge configurations.
Figure 12B:
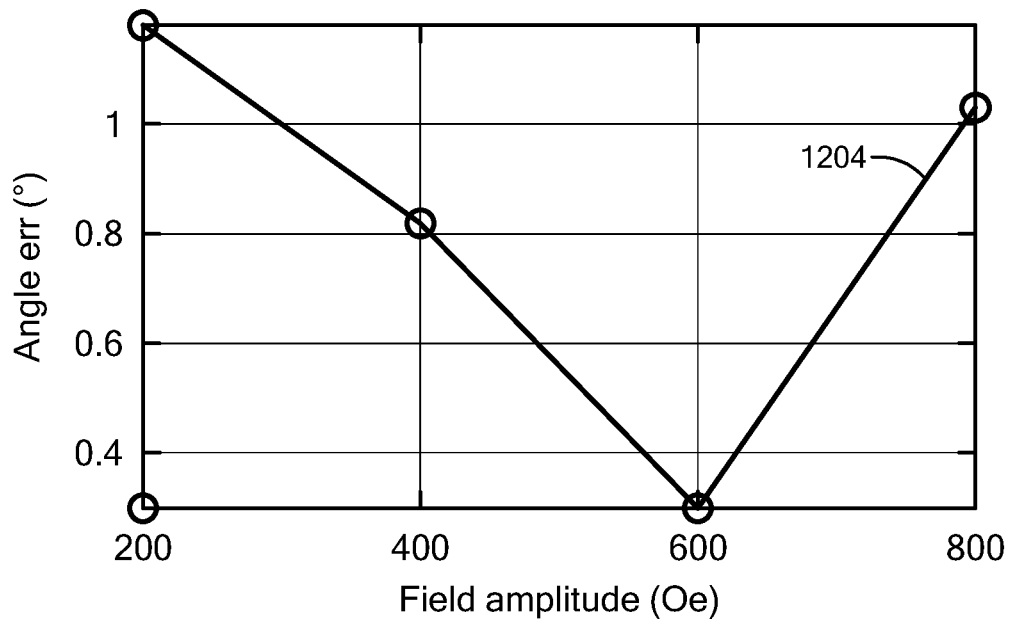
Figure 12C:
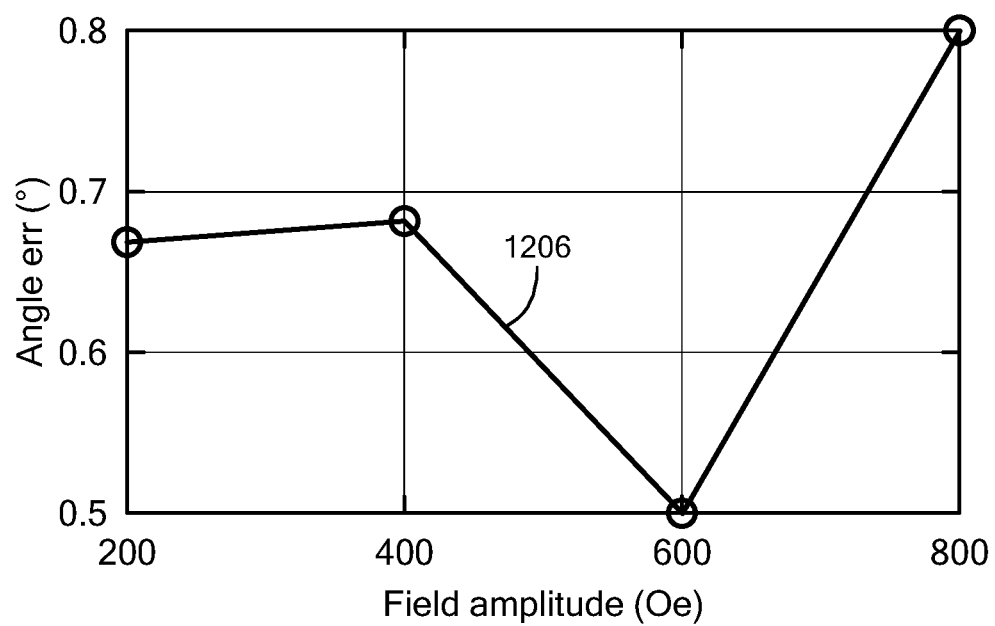

Referring to FIGS. 12A to 12C, a curve 1202 of the angle error versus field amplitude for a bridge such as one depicted in FIG. 7 indicates that angle error increases significantly above a field amplitude of 400 Oe to above a 3° angle error at about a field amplitude of 800 Oe. A curve 1204 of the angle error versus field amplitude for a bridge with replacement MR elements in series such as depicted in FIG. 10, for example, indicates that angle error is below 1.2° for field amplitudes of 800 Oe and below. A curve 1206 of the angle error versus field amplitude for a bridge with replacement MR elements in parallel such as depicted in FIG. 11, for example, indicates that angle error is below 0.8° for field amplitudes of 800 Oe and below.

Figure 13A:
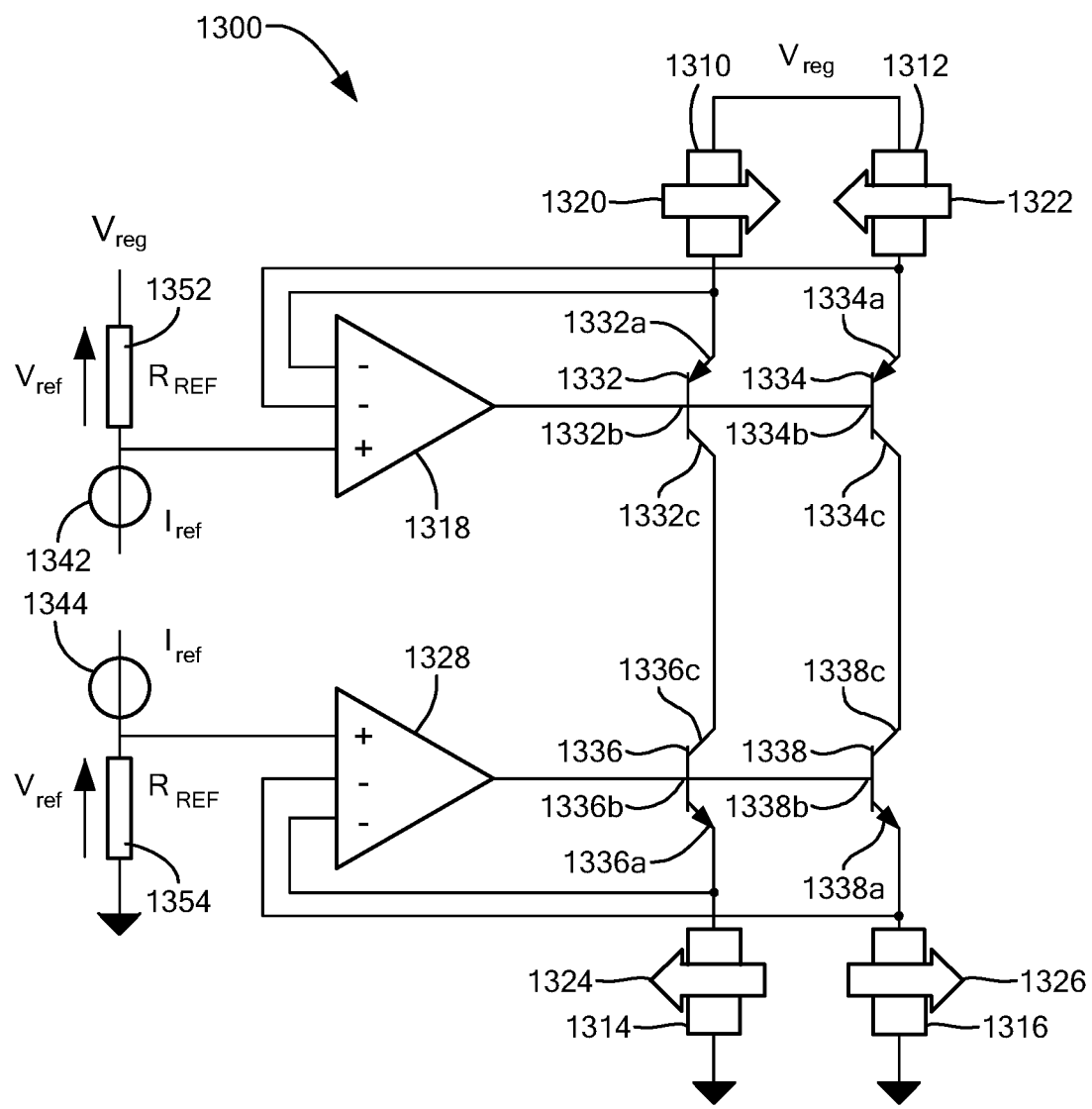
FIG. 13A is a diagram of an example of a conductance bridge configuration.

Referring to FIG. 13A, a conductance bridge configuration 1300 includes MR elements (e.g., an MR element 1310, an MR element 1312, an MR element 1314 and an MR element 1316). The conductance bridge configuration 1300 also includes an amplifier 1318, an amplifier 1328, a transistor 1332, a transistor 1334, a transistor 1336 and a transistor 1338.

The MR element 1310, 1312 are coupled to a voltage source $V_{reg}$ and the MR elements 1314, 1316 are coupled to ground. A collector 1332c of the transistor 1332 is coupled to a collector 1336c of the transistor 1336 and a collector 1334c of the transistor 1334 is coupled to a collector 1338c of the transistor 1338.

Each MR element 1310-1316 has a reference direction. For example, the MR element 1310 has a reference direction 1320, the MR element 1312 has a reference direction 1322, the MR element 1314 has a reference direction 1324 and the MR element 1316 has a reference direction 1326. The reference direction 1320 is substantially in the same direction as reference direction 1326, but substantially in the opposite direction to reference directions 1322, 1324.

In one example, the transistors 1332, 1334 are PNP bipolar junction transistors. In one example, the transistors 1336, 1338 are NPN bipolar junction transistors.

An output of the amplifier 1318 is coupled to a base 1332b of the transistor 1332 and is coupled to a base 1334b of the transistor 1334. A first input of the amplifier 1318 is coupled to the MR element 1310 and is coupled to an emitter 1332a of the transistor 1332. A second input of the amplifier 1318 is coupled to the MR element 1312 and is coupled to an emitter 1334a of the transistor 1334. A third input of the amplifier 1318 is coupled to a current source 1342 providing a current, $I_{ref}$ and coupled to a resistor 1352 having a resistance $R_{ref}$. The resistor 1352 is coupled to the voltage source $V_{reg}$.

An output of the amplifier 1328 is coupled to a base 1336*b* of the transistor 1336 and is coupled to a base 1338*b* of the transistor 1338. A first input of the amplifier 1328 is coupled to the MR element 1314 and is coupled to an emitter 1336*a* of the transistor 1336. A second input of the amplifier 1328 is coupled to the MR element 1316 and is coupled to an emitter 1338*a* of the transistor 1338. A third input of the amplifier 1338 is coupled to a current source 1344 providing a current, $I_{ref}$ and coupled to a resistor 1354 having a resistance $R_{ref}$. The resistor 1354 is coupled to ground.

Figure 13B:
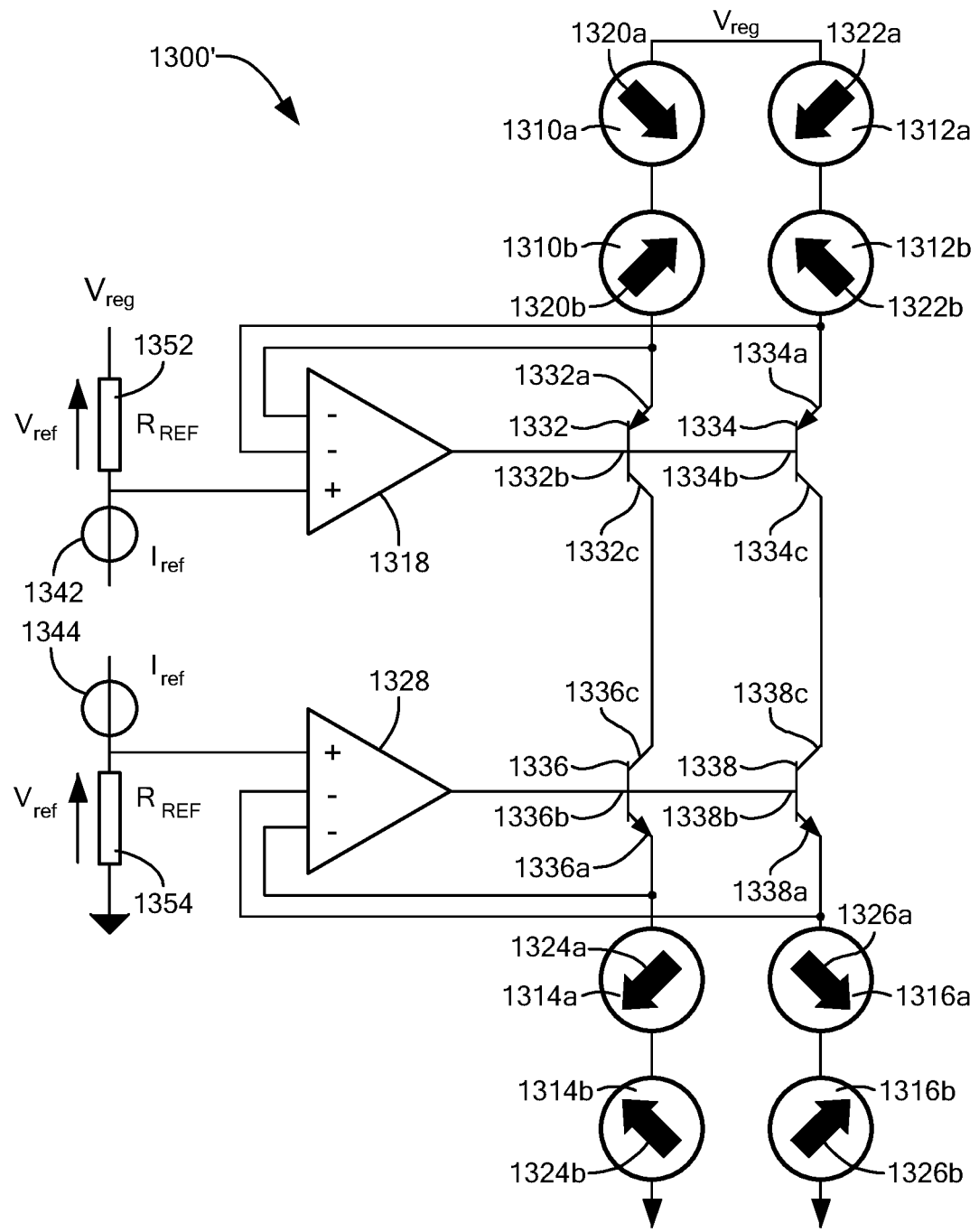
FIG. 13B is a diagram of the conductance bridge configuration of FIG. 13A being replaced by MR elements in series.

Referring to FIGS. 13A and 13B, the MR elements of 1310-1316 may be each be replaced by two or more MR elements in series. For example, in a conductance bridge 1300', the MR element 1310 has been replaced by an MR element 1310*a* and an MR element 1310*b*, the MR element 1312 has been replaced by an MR element 1312*a* and an MR element 1312*b*, the MR element 1314 has been replaced by an MR element 1314*a* and an MR element 1314*b* and the MR element 1316 has been replaced by an MR element 1316*a* and an MR element 1316*b*.

The MR element 1310*a* includes a reference direction 1320*a*, the MR element 1310*b* includes a reference direction 1320*b* and the average of the reference direction 1320*a* and the reference direction 1320*b* is equal to the reference direction 1320. The MR element 1312*a* includes a reference direction 1322*a*, the MR element 1312*b* includes a reference direction 1322*b* and the average of the reference direction 1322*a* and the reference direction 1322*b* is equal to the reference direction 1322. The MR element 1314*a* includes a reference direction 1324*a*, the MR element 1314*b* includes a reference direction 1324*b* and the average of the reference direction 1324*a* and the reference direction 1324*b* is equal to the reference direction 1324. The MR element 1316*a* includes a reference direction 1326*a*, the MR element 1316*b* includes a reference direction 1326*b* and the average of the reference direction 1326*a* and the reference direction 1326*b* is equal to the reference direction 1326.

The replacement MR elements are added in series so that the sum of the resistance of both replacement MR elements equals the resistance of the MR element being replaced. For example, the resistance of the MR element 1310*a* and the resistance of the MR element 1310*b* is equal to the resistance of the MR element 1310, the resistance of the MR element 1312*a* and the resistance of the MR element 1312*b* is equal to the resistance of the MR element 1312, the resistance of the MR element 1314*a* and the resistance of the MR element 1314*b* is equal to the resistance of the MR element 1314 and the resistance of the MR element 1316*a* and the resistance of the MR element 1316*b* is equal to the resistance of the MR element 1316.

Figure 13C:
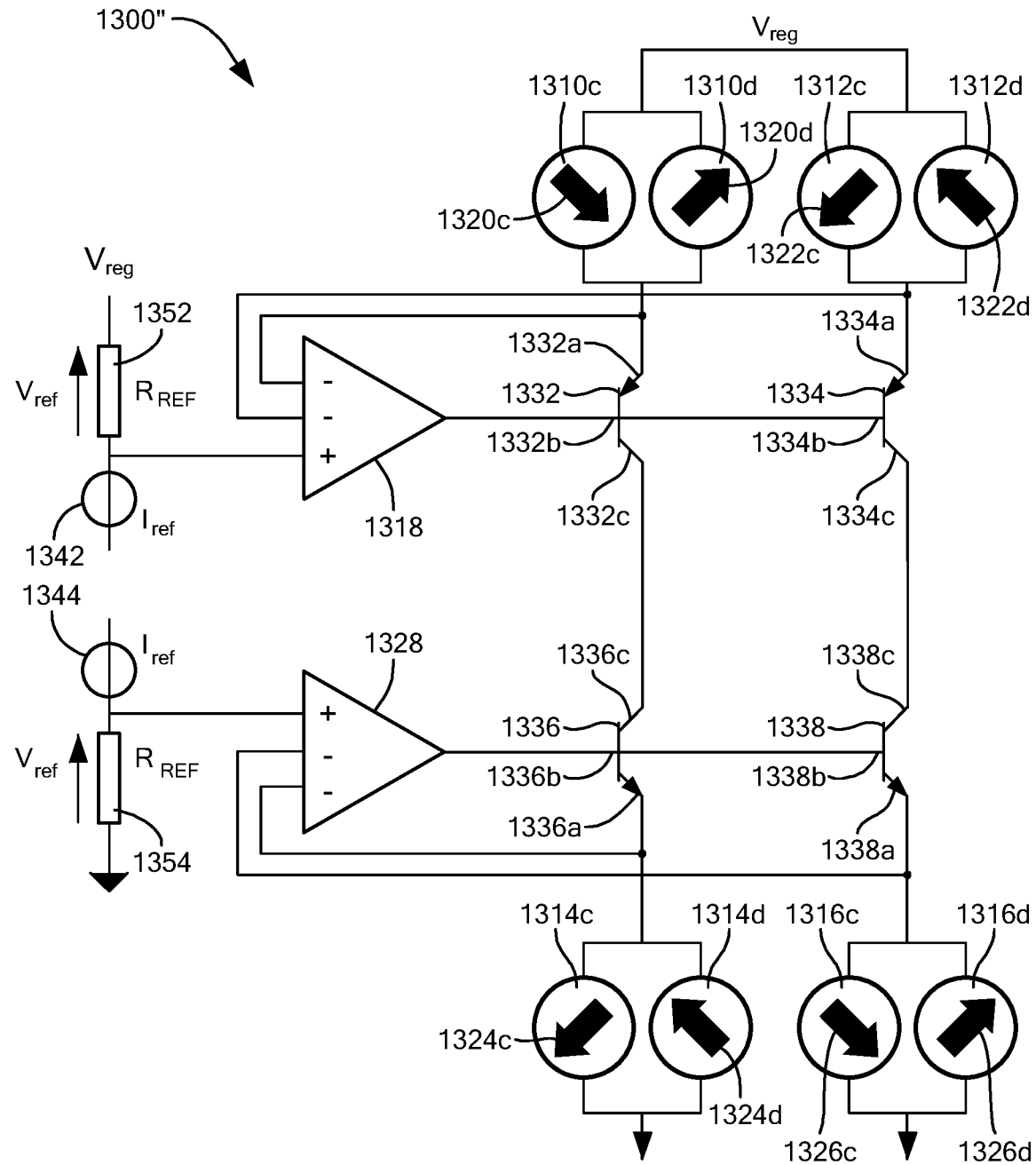
FIG. 13C is a diagram of the conductance bridge configuration of FIG. 13A being replaced by MR elements in parallel.

Referring to FIGS. 13A and 13C, the MR elements of 1310-1316 may be each be replaced by two or more MR elements in parallel. For example, in a conductance bridge 1300", the MR element 1310 has been replaced by an MR element 1310*c* and an MR element 1310*d*, the MR element 1312 has been replaced by an MR element 1312*c* and an MR element 1312*d*, the MR element 1314 has been replaced by an MR element 1314*c* and an MR element 1314*d* and the MR element 1316 has been replaced by an MR element 1316*c* and an MR element 1316*d*.

The MR element 1310*c* includes a reference direction 1320*c*, the MR element 1310*d* includes a reference direction 1320*d* and the average of the reference direction 1320*c* and the reference direction 1320*d* is equal to the reference direction 1320. The MR element 1312*c* includes a reference direction 1322*c*, the MR element 1312*d* includes a reference direction 1322*d* and the average of the reference direction 1322*c* and the reference direction 1322*d* is equal to the reference direction 1322. The MR element 1314*c* includes a reference direction 1324*c*, the MR element 1314*d* includes a reference direction 1324*d* and the average of the reference direction 1324*c* and the reference direction 1324*d* is equal to the reference direction 1324. The MR element 1316*c* includes a reference direction 1326*c*, the MR element 1316*d* includes a reference direction 1326*d* and the average of the reference direction 1326*c* and the reference direction 1326*d* is equal to the reference direction 1326.

The replacement MR elements are added in parallel so that the sum of the reciprocals of the resistance of both replacement MR elements equals the reciprocal of the resistance of the MR element being replaced. For example, a reciprocal of the resistance of the MR element 1310*c* and a reciprocal of the resistance of the MR element 1310*d* is equal to a reciprocal of the resistance of the MR element 1310; a reciprocal of the resistance of the MR element 1312*c* and a reciprocal of the resistance of the MR element 1312*d* is equal to a reciprocal of the resistance of the MR element 1312; a reciprocal of the resistance of the MR element 1314*c* and a reciprocal of the resistance of the MR element 1314*d* is equal to a reciprocal of the resistance of the MR element 1314; and a reciprocal of the resistance of the MR element 1316*c* and a reciprocal of the resistance of the MR element 1316*d* is equal to a reciprocal of the resistance of the MR element 1316.

Figure 14:
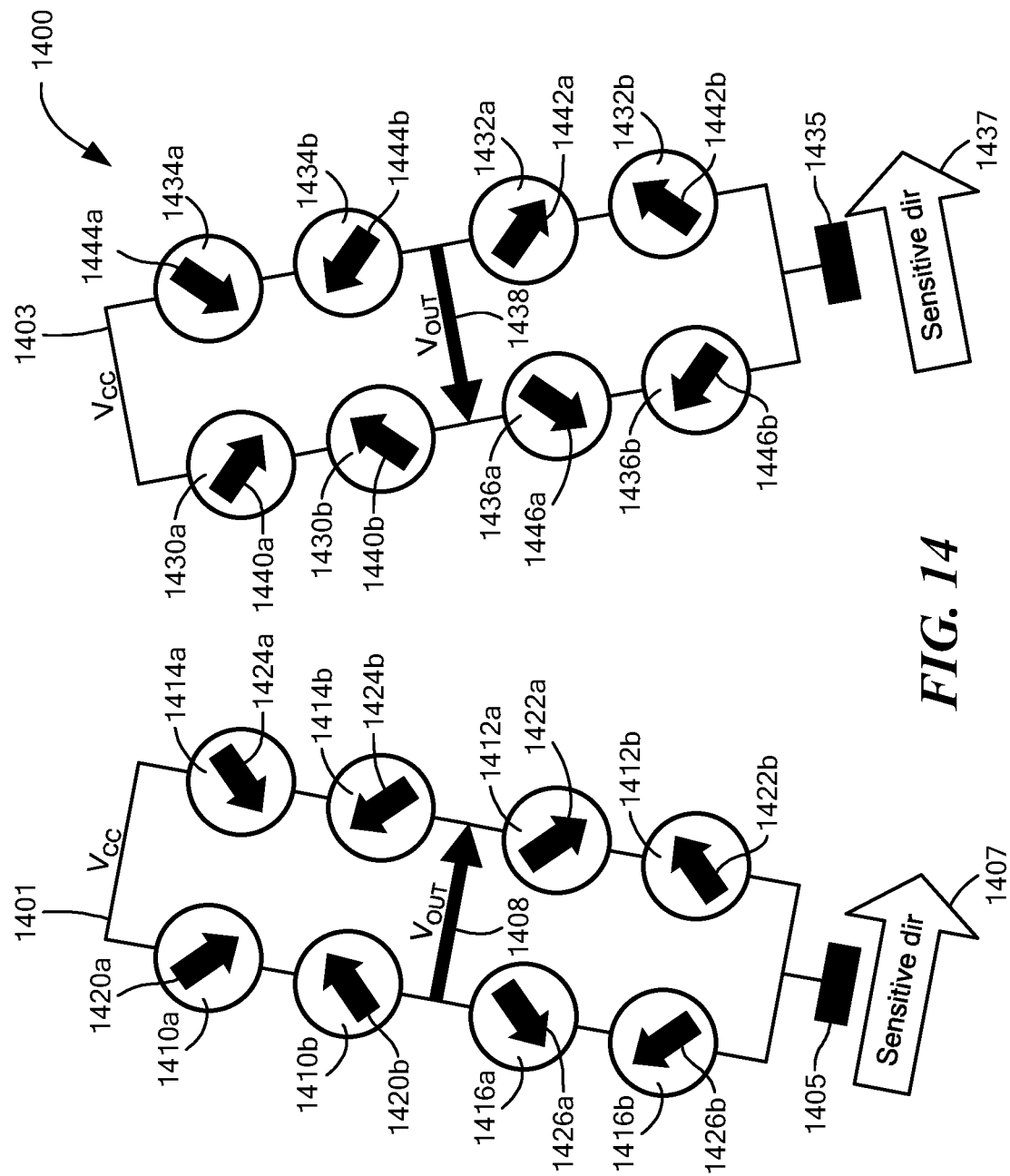
FIG. 14 is a diagram of an example of MR elements of the bridge structure of FIG. 1 being replaced by MR elements in series.
Figure 14:
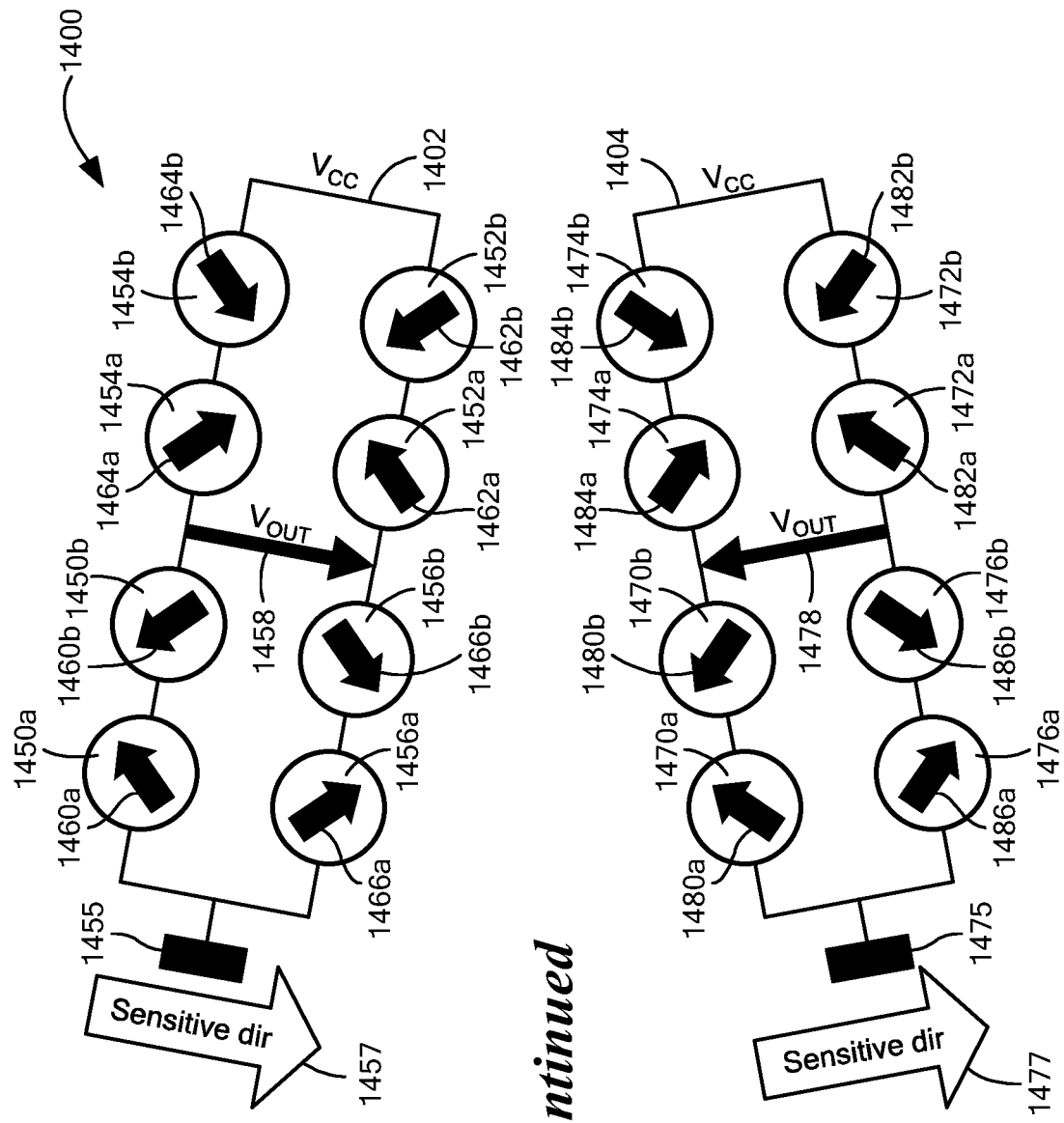

Referring to FIG. 14, in one example, MR elements of the bridge structure of FIG. 1 are replaced by MR elements in series. A bridge structure 1400 includes a first cosine bridge 1401, a first sine bridge 1402, a second sine bridge 1403 and a second sine bridge 1404.

The first cosine bridge 1401 includes MR elements 1410*a*, 1410*b*, 1412*a*, 1412*b*, 1414*a*, 1414*b*, 1416*a*, 1416*b*. The MR elements 1410*a*, 1410*b* replace the MR element 126*c* (FIG. 1), the MR elements 1412*a*, 1412*b* replace the MR element 126*a* (FIG. 1), the MR elements 1414*a*, 1414*b* replace the MR element 126*b* (FIG. 1) and the MR elements 1416*a*, 1416*b* replace the MR element 126*d* (FIG. 1).

The MR elements 1410*a*, 1414*a* are coupled to a supply voltage $V_{CC}$ and the MR elements 1416*b*, 1412*b* are coupled to ground 1405. The first cosine bridge 1401 generates a cosinusoidal signal, $V_{OUT}$ 1408, indicative of a cosine of an angle of a measured magnetic field plus a tilt angle, $\varphi_{tilt}$, of the bridge structure 1400.

The MR element 1410*a* includes a reference direction 1420*a* and the MR element 1410*b* includes a reference direction 1420*b*. The MR element 1412*a* includes a reference direction 1422*a* and the MR element 1412*b* includes a reference direction 1422*b*. The MR element 1414*a* includes a reference direction 1424*a* and the MR element 1414*b* includes a reference direction 1424*b*. The MR element 1416*a* includes a reference direction 1426*a* and the MR element 1416*b* includes a reference direction 1426*b*.

The average of the reference directions 1420*a*, 1420*b*, 1422*a*, 1422*b* 1424*a*, 1424*b*, 1426*a*, 1426*b* is equal to a sensitive direction 1407.

The second cosine bridge 1403 includes MR elements 1430*a*, 1430*b*, 1432*a*, 1432*b*, 1434*a*, 1434*b*, 1436*a*, 1436*b*. The MR elements 1430*a*, 1430*b* replace the MR element 136*c* (FIG. 1), the MR elements 1432*a*, 1432*b* replace the MR element 136*a* (FIG. 1), the MR elements 1434*a*, 1434*b* replace the MR element 136b (FIG. 1) and the MR elements 1436a, 1436b replace the MR element 136d (FIG. 1).

The MR elements 1430a, 1434a are coupled to a supply voltage Vcc and the MR elements 1436b, 1432b are coupled to ground 1435. The second cosine bridge 1403 generates a cosinusoidal signal, $V_{OUT}$ 1438, indicative of a cosine of the angle of the measured magnetic field less $\varphi_{tilt}$.

The MR element 1430a includes a reference direction 1440a and the MR element 1430b includes a reference direction 1440b. The MR element 1432a includes a reference direction 1442a and the MR element 1432b includes a reference direction 1442b. The MR element 1434a includes a reference direction 1444a and the MR element 1434b includes a reference direction 1444b. The MR element 1436a includes a reference direction 1446a and the MR element 1436b includes a reference direction 1446b.

The average of the reference directions 1440a, 1440b, 1442a, 1442b 1444a, 1444b, 1446a, 1446b is equal to a sensitive direction 1437.

The first sine bridge 1402 includes MR elements 1450a, 1450b, 1452a, 1452b, 1454a, 1454b, 1456a, 1456b. The MR elements 1450a, 1450b replace the MR element 124c (FIG. 1), the MR elements 1452a, 1452b replace the MR element 124a (FIG. 1), the MR elements 1454a, 1454b replace the MR element 124d (FIG. 1) and the MR elements 1456a, 1456b replace the MR element 124b (FIG. 1).

The MR elements 1452b, 1454b are coupled to a supply voltage $V_{CC}$ and the MR elements 1450a, 1456a are coupled to ground 1455. The first sine bridge 1403 generates a sinusoidal signal $V_{OUT}$ 1458, indicative of a sine of the angle of the measured magnetic field plus $\varphi_{tilt}$ and orthogonal to the cosinusoidal signal, $V_{OUT}$ 1408.

The MR element 1450a includes a reference direction 1460a and the MR element 1450b includes a reference direction 1460b. The MR element 1452a includes a reference direction 1462a and the MR element 1452b includes a reference direction 1462b. The MR element 1454a includes a reference direction 1464a and the MR element 1454b includes a reference direction 1464b. The MR element 1456a includes a reference direction 1466a and the MR element 1456b includes a reference direction 1466b.

The average of the reference directions 1460a, 1460b, 1462a, 1462b 1464a, 1464b, 1466a, 1466a is equal to a sensitive direction 1457.

The second sine bridge 1404 includes MR elements 1470a, 1470b, 1472a, 1472b, 1474a, 1474b, 1476a, 1476b. The MR elements 1470a, 1470b replace the MR element 134b (FIG. 1), the MR elements 1472a, 1472b replace the MR element 134d (FIG. 1), the MR elements 1474a, 1474b replace the MR element 134a (FIG. 1) and the MR elements 1476a, 1476b replace the MR element 134c (FIG. 1).

The MR elements 1472b, 1474b are coupled to a supply voltage Vcc and the MR elements 1470a, 1476a are coupled to ground 1475. The first sine bridge 1404 generates a sinusoidal signal $V_{OUT}$ 1478, indicative of a sine of the angle of the measured magnetic field less $\varphi_{tilt}$ and orthogonal to the cosinusoidal signal, $V_{OUT}$ 1438.

The MR element 1470a includes a reference direction 1480a and the MR element 1470b includes a reference direction 1480b. The MR element 1472a includes a reference direction 1482a and the MR element 1472b includes a reference direction 1482b. The MR element 1474a includes a reference direction 1484a and the MR element 1474b includes a reference direction 1484b. The MR element 1476a includes a reference direction 1486a and the MR element 1476b includes a reference direction 1486b.

The average of the reference directions 1480a, 1480b, 1482a, 1482b 1484a, 1484b, 1486a, 1486a is equal to a sensitive direction 1477.

While FIG. 14 shows an example of MR elements of the bridge structure of FIG. 1 being replaced by MR elements in series, one of ordinary skill in the art upon reading this disclosure would recognize that the MR elements in FIG. 1 may also be replaced with MR elements in parallel or replaced by some MR elements in series and other MR elements in parallel.

Figure 15:
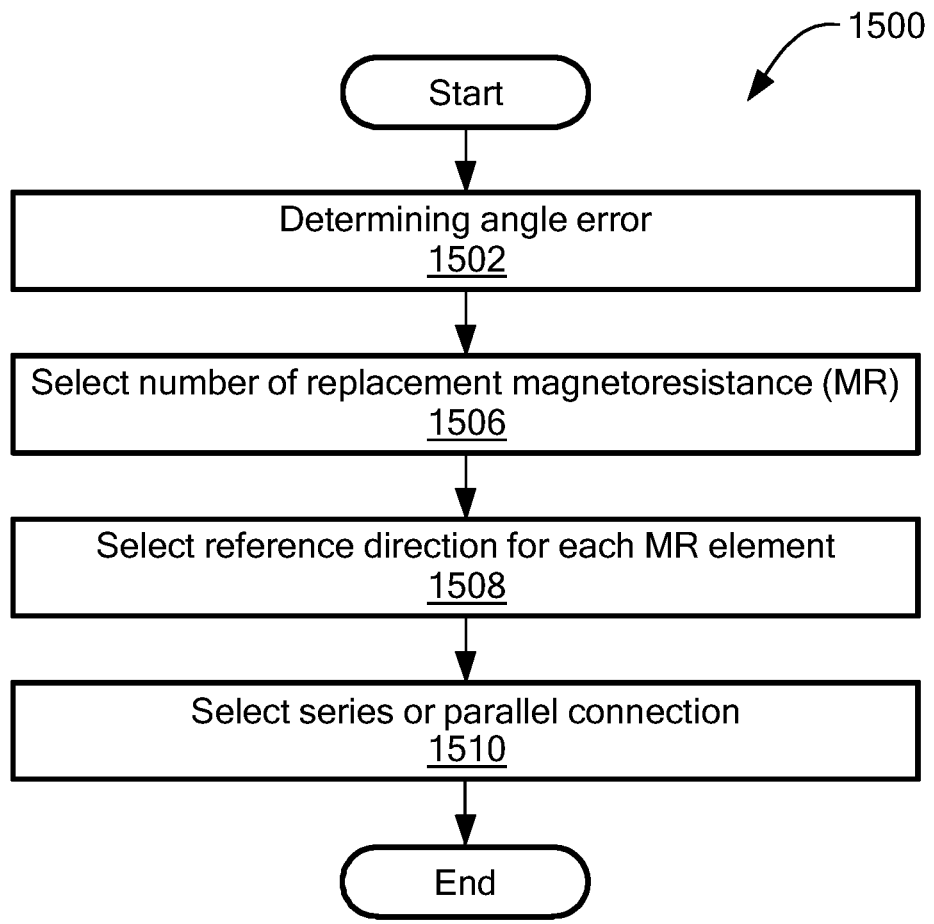
FIG. 15 is a flowchart of an example of a process to replace MR elements in a bridge to reduce angel errors.

Referring to FIG. 15, an example of a process to replace MR elements in a bridge in a magnetic field angle sensor to reduce angle errors is a process 1500. Process 1500 determines an angle error (1502). For example, the angle error of an MR element to be replaced is determined.

Process 1500 selects a number of replacement MR elements (1506). For example, two or more replacement MR elements may be used to replace an MR element. The number of replacement MR elements may be determined based on the angle error determined in processing block 1502. The number of replacement MR elements may be determined based on the application of the magnetic field sensor.

Process 1500 selects a reference direction for each replacement MR element (1508). In one example, the average of the reference directions of the replacement MR elements equals the reference direction of the MR element being replaced. The reference direction for each replacement MR element may be determined based on the angle error determined in processing block 1502. The reference direction for each replacement MR element may be determined based on the application of the magnetic field sensor.

Process 1500 selects whether the replacement MR elements will be placed in series or in parallel (1510). In one example, replacement MR elements in parallel are more immune to Rmin mismatch than in series while MR replacement elements in series are more immune to MRmin mismatch. The mismatch of Rmin is the variability of an Rmin parameter across all MR elements of the bridge and may be expressed as:

(max(all *R*min)−min(all *R*min))*2/(max(all *R*min)+ min(all *R*min)), where Rmin is a minimum resistance of an MR element. The mismatch of MRmin is the variability of a MRmin parameter across all MR elements of the bridge and can be expressed as:

(max(all *MR*min)−min(all *MR*min))*2/(max(all *MR*min)+min(all *MR*min)), where MRmin is the magnetoresistance of the element expressed as:

(*R*max−*R*min)/*R*min.

The techniques described herein are not limited by the examples presented herein. For example, even though embodiments described herein show replacement of MR elements by MR elements in series or MR elements in parallel, one of ordinary skill in the art would recognize upon read the disclosure herein that a combination of MR elements in parallel and series may be used to replace an MR element. In one example, an MR element may be replaced by two or more MR elements arranged in series and at least one MR element arranged in parallel with the two or more MR elements. In another example, an MR element may be replaced by at least one MR element arranged in series and two or more MR elements arranged in parallel with the at least one MR element. In a further example, an MR element may be replaced by at least three MR elements arranged in series and two or more MR elements arranged in parallel with the at least three MR elements.

The processes described herein are not limited to the specific examples described. For example, the process 1500 is not limited to the specific processing order of FIG. 15. Rather, any of the processing blocks of FIG. 15 may be re-ordered, combined or removed, performed in parallel or in serial, as necessary, to achieve the results set forth above.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field angle sensor comprising:
   a bridge structure comprising:
      a sine bridge configured to generate a sinusoidal signal indicative of a magnetic field along a first axis;
      a cosine bridge configured to generate a cosinusoidal signal indicative of the magnetic field along a second axis that is orthogonal with respect to the first axis;
   wherein one of the sine bridge or the cosine bridge comprises:
      a first set of at least two magnetoresistance elements;
      a second set of at least one magnetoresistance element;
      a third set of at least one magnetoresistance element; and
      a fourth set of at least one magnetoresistance element,
   wherein an average reference direction of the first set of at least two magnetoresistance elements is equal to an average reference direction of the third set of at least one magnetoresistance element, and
   wherein an average reference direction of the second set of at least one magnetoresistance element is equal to an average direction angle of the fourth set of at least one magnetoresistance element,
   wherein the first set of at least two magnetoresistance elements comprises:
      a first magnetoresistance element having a reference angle that is at an angle $\varphi_C$ from the average reference angle of the first set of at least two magnetoresistance elements; and
      a second magnetoresistance element having a reference angle that is at an angle $-\varphi_C$ from the average reference angle of the first set of at least two magnetoresistance elements.

2. The magnetic field angle sensor of claim 1, wherein the first set of at least two magnetoresistance elements comprises at least two magnetoresistance elements arranged in series to each other.

3. The magnetic field angle sensor of claim 1, wherein the first set of at least two magnetoresistance elements comprises at least two magnetoresistance elements arranged in parallel to each other.

4. The magnetic field angle sensor of claim 1, wherein the first set of at least two magnetoresistance elements comprises two or more magnetoresistance elements arranged in series to each other and at least one magnetoresistance element arranged in parallel with the two or more magnetoresistance elements.

5. The magnetic field angle sensor of claim 1, wherein the second set of at least one magnetoresistance element comprises at least two magnetoresistance elements.

6. The magnetic field angle sensor of claim 5, wherein the second set of at least one magnetoresistance elements comprises at least two magnetoresistance elements arranged in series to each other.

7. The magnetic field angle sensor of claim 5, wherein the second set of at least one magnetoresistance elements comprises at least two magnetoresistance elements arranged in parallel to each other.

8. The magnetic field angle sensor of claim 5, wherein the second set of at least two magnetoresistance elements comprises two or more magnetoresistance elements arranged in parallel to each other, and at least one magnetoresistance element in series with the two or more magnetoresistance elements.

9. The magnetic field angle sensor of claim 5, wherein the third set of at least one magnetoresistance element comprises at least two magnetoresistance elements.

10. The magnetic field angle sensor of claim 9, wherein the third set of at least one magnetoresistance elements comprises at least two magnetoresistance elements arranged in series to each other.

11. The magnetic field angle sensor of claim 9, wherein the third set of at least one magnetoresistance elements comprises at least two magnetoresistance elements arranged in parallel to each other.

12. The magnetic field angle sensor of claim 9, wherein the third set of at least two magnetoresistance elements comprises at least three magnetoresistance elements arranged in series to each other, and two or more magnetoresistance elements arranged in parallel with the at least three magnetoresistance elements.

13. The magnetic field angle sensor of claim 9, wherein the fourth set of at least one magnetoresistance element comprises at least two magnetoresistance elements.

14. The magnetic field angle sensor of claim 13, wherein the fourth set of at least one magnetoresistance elements comprises at least two magnetoresistance elements arranged in series to each other.

15. The magnetic field angle sensor of claim 13, wherein the fourth set of at least one magnetoresistance elements comprises at least two magnetoresistance elements arranged in parallel to each other.

16. The magnetic field angle sensor of claim 1, wherein a resistance of the first set of at least two magnetoresistance elements is equal to a resistance of the third set of at least one magnetoresistance element.

17. The magnetic field angle sensor of claim 16, wherein a resistance of the second set of at least one magnetoresistance element is equal to a resistance of the fourth set of at least one magnetoresistance element.

18. The magnetic field angle sensor of claim 1, wherein the average reference direction of the first set of at least two magnetoresistance elements is opposite the average reference direction of the second set of at least one magnetoresistance element.

19. The magnetic field angle sensor of claim 1, wherein the angle $\varphi_C$ is between 20° and 40°.

20. The magnetic field angle sensor of claim 19, wherein the angle $\varphi_C$ is between 25° and 37°.

21. The magnetic field angle sensor of claim 19, wherein the angle $\varphi_C$ is 22.5°.

22. The magnetic field angle sensor of claim 1, wherein the angle $\varphi_C$ is associated with at least one harmonic error of a magnetoresistance element.

23. The magnetic field angle sensor of claim 22, wherein the angle $\varphi_C$ is associated with a fourth harmonic error of a magnetoresistance element.

24. The magnetic field angle sensor of claim 1, wherein the other one of the sine bridge or the cosine bridge comprises:
a fifth set of at least two magnetoresistance elements;
a sixth set of at least one magnetoresistance element;
a seventh set of at least one magnetoresistance element; and
an eighth set of at least one magnetoresistance element,
wherein an average reference direction of the fifth set of at least two magnetoresistance elements is equal to an average reference direction of the seventh set of at least one magnetoresistance element, and
wherein an average reference direction of the sixth set of at least one magnetoresistance element is equal to an average direction angle of the eighth set of at least one magnetoresistance element.

25. The magnetic field angle sensor of claim 24, wherein the fifth set of at least two magnetoresistance elements, the sixth set of at least one magnetoresistance element, the seventh set of at least one magnetoresistance element and the eighth set of at least one magnetoresistance element comprise one or more of giant magnetoresistance (GMR) elements, anisotropic magnetoresistance (AMR) elements, tunneling magnetoresistance (TMR) elements or magnetic tunnel junction (MTJ) elements.

26. The magnetic field angle sensor of claim 24, wherein each of the fifth set of at least two magnetoresistance elements, the sixth set of at least one magnetoresistance element, the seventh set of at least one magnetoresistance element and the eighth set of at least one magnetoresistance element comprise a reference layer and a free layer.

27. The magnetic field angle sensor of claim 1, wherein the first set of at least two magnetoresistance elements, the second set of at least one magnetoresistance element, the third set of at least one magnetoresistance element and the fourth set of at least one magnetoresistance element comprise one or more of giant magnetoresistance (GMR) elements, anisotropic magnetoresistance (AMR) elements, tunneling magnetoresistance (TMR) elements or magnetic tunnel junction (MTJ) elements.

28. The magnetic field angle sensor of claim 1, wherein each of the first set of at least two magnetoresistance elements, the second set of at least one magnetoresistance element, the third set of at least one magnetoresistance element and the fourth set of at least one magnetoresistance element comprises a reference layer and a free layer.

29. The magnetic field angle sensor of claim 1, wherein the magnetic field angle sensor comprises one or more of a voltage bridge, a current bridge, or a conductance bridge.

30. A magnetic field angle sensor comprising:
a bridge structure comprising:
a sine bridge configured to generate a sinusoidal signal indicative of a magnetic field along a first axis;
a cosine bridge configured to generate a cosinusoidal signal indicative of the magnetic field along a second axis that is orthogonal with respect to the first axis;
wherein one of the sine bridge or the cosine bridge comprises:
a first set of at least two magnetoresistance elements;
a second set of at least one magnetoresistance element;
a third set of at least one magnetoresistance element; and
a fourth set of at least one magnetoresistance element,
wherein an average reference direction of the first set of at least two magnetoresistance elements is equal to an average reference direction of the third set of at least one magnetoresistance element, and
wherein an average reference direction of the second set of at least one magnetoresistance element is equal to an average direction angle of the fourth set of at least one magnetoresistance element,
wherein the first set of at least two magnetoresistance elements comprises:
a first magnetoresistance element having a reference angle that is an adjusted angle, $\varphi_{adj}$, from the average reference angle of the first set of at least two magnetoresistance elements;
a second magnetoresistance element having a reference angle that is $\varphi_{adj}$ from the average reference angle of the first set of at least two magnetoresistance elements; and
a third magnetoresistance element having a reference direction in a sensitive direction,
wherein the sensitive direction is an average reference direction of the first, second and third magnetoresistance elements.

31. The magnetic field angle sensor of claim 30, wherein the first set of at least two magnetoresistance elements, the second set of at least one magnetoresistance element, the third set of at least one magnetoresistance element and the fourth set of at least one magnetoresistance element comprise one or more of giant magnetoresistance (GMR) elements, anisotropic magnetoresistance (AMR) elements, tunneling magnetoresistance (TMR) elements or magnetic tunnel junction (MTJ) elements.

32. The magnetic field angle sensor of claim 30, wherein each of the first set of at least two magnetoresistance elements, the second set of at least one magnetoresistance element, the third set of at least one magnetoresistance element and the fourth set of at least one magnetoresistance element comprises a reference layer and a free layer.

33. The magnetic field angle sensor of claim 30, wherein the other one of the sine bridge or the cosine bridge comprises:
a fifth set of at least two magnetoresistance elements;
a sixth set of at least one magnetoresistance element;
a seventh set of at least one magnetoresistance element; and
an eighth set of at least one magnetoresistance element,
wherein an average reference direction of the fifth set of at least two magnetoresistance elements is equal to an average reference direction of the seventh set of at least one magnetoresistance element, and
wherein an average reference direction of the sixth set of at least one magnetoresistance element is equal to an average direction angle of the eighth set of at least one magnetoresistance element.

34. The magnetic field angle sensor of claim 33, wherein the fifth set of at least two magnetoresistance elements, the sixth set of at least one magnetoresistance element, the seventh set of at least one magnetoresistance element and the eighth set of at least one magnetoresistance element comprise one or more of giant magnetoresistance (GMR) elements, anisotropic magnetoresistance (AMR) elements, tunneling magnetoresistance (TMR) elements or magnetic tunnel junction (MTJ) elements.

* * * * *

UNITED STATES PATENT AND TRADEMARK OFFICE
CERTIFICATE OF CORRECTION

PATENT NO. : 11,199,424 B2
APPLICATION NO. : 16/553641
DATED : December 14, 2021
INVENTOR(S) : Rémy Lassalle-Balier et al.

It is certified that error appears in the above-identified patent and that said Letters Patent is hereby corrected as shown below:

On the Title Page

Abstract, Line 2 delete "include" and replace with --includes--.

In the Specification

Column 1, Line 36 delete "(TMR)." and replace with --(TMR) elements.--.

Column 1, Line 54 delete "include" and replace with --includes--.

Column 2, Line 18 delete "elements" and replace with --element--.

Column 2, Line 27 delete "elements" and replace with --element--.

Column 2, Line 29 delete "elements" and replace with --element--.

Column 2, Line 40 delete "elements" and replace with --element--.

Column 2, Line 59 delete "The $\varphi_C$" and replace with --The angle $\varphi_C$--.

Column 4, Line 8 delete "illustrating angle" and replace with --illustrating an angle--.

Column 4, Line 10 delete "illustrating angle" and replace with --illustrating an angle--.

Column 4, Line 21 delete "example MR" and replace with --example of MR--.

Column 4, Line 24 delete "example MR" and replace with --example of MR--.

Column 5, Line 60 delete "illustrates of each" and replace with --illustrates each--.

Signed and Sealed this
Sixth Day of June, 2023

Katherine Kelly Vidal
*Director of the United States Patent and Trademark Office*

Column 7, Line 34 delete "side or" and replace with --side of--.

Column 7, Line 55 delete "for GMR or insulating for TMR." and replace with --for the GMR element or insulating for the TMR element.--.

Column 8, Line 28 delete "pinning" and replace with --pinning factor--.

Column 8, Line 51 delete "can by" and replace with --can be--.

Column 9, Line 5 delete "created" and replace with --creating--.

Column 9, Line 67 delete "112," and replace with --212,--.

Column 10, Line 14 delete "and an angle 251" and replace with --an angle 251--.

Column 10, Line 30 delete "titled" and replace with --tilted--.

Column 10, Line 43 delete "disposed a" and replace with --disposed at--.

Column 10, Lines 55-56 delete "axes first," and replace with --axes of first,--.

Column 11, Line 14 delete "titled" and replace with --tilted--.

Column 11, Line 16 delete "titled" and replace with --tilted--.

Column 11, Line 65 delete "pining" and replace with --pinning--.

Column 12, Line 7 delete "compared the" and replace with --compared to the--.

Column 12, Line 19 delete "compared the" and replace with --compared to the--.

Column 12, Line 43 delete "coupled to or a" and replace with --coupled to a--.

Column 12, Line 44 delete "FIG. 0.1" and replace with --FIG. 1--.

Column 13, Line 2 delete "can be compute" and replace with --can compute--.

Column 13, Line 52 delete "FIG. 0.2" and replace with --FIG. 2--.

Column 13, Line 63 delete "sin" and replace with --sine--.

Column 13, Line 65 delete "sin" and replace with --sine--.

Column 14, Line 8 delete "can be compute" and replace with --can compute--.

Column 14, Line 44 delete "angle" and replace with --angles--.

CERTIFICATE OF CORRECTION (continued)
U.S. Pat. No. 11,199,424 B2

Column 14, Line 62 delete "can be compute" and replace with --can compute--.

Column 16, Lines 2-3 delete "and compute" and replace with --and can compute--.

Column 17, Line 58 delete "(of first" and replace with --(or first--.

Column 17, Line 61 delete "(of first" and replace with --(or first--.

Column 17, Line 63 delete "(of" and replace with --(or--.

Column 18, Line 33 delete "layers" and replace with --layers'--.

Column 18, Line 36 delete "structure" and replace with --structures--.

Column 18, Line 37 delete "layers" and replace with --layers'--.

Column 18, Line 39 delete "layers" and replace with --layers'--.

Column 18, Line 60 delete "by first" and replace with --by the first--.

Column 24, Line 44 delete "element" and replace with --elements--.

Column 25, Line 16 delete "may be each be" and replace with --may each be--.

Column 25, Line 56 delete "may be each be" and replace with --may each be--.

Column 27, Line 44 delete "1466$a$, 1466$a$" and replace with --1466$a$, 1466$b$--.

Column 28, Line 2 delete "1486$a$, 1486$a$" and replace with --1486$a$, 1486$b$--.

Column 28, Line 59 delete "read" and replace with --reading--.

Column 29, Line 9 delete "serial," and replace with --series,--.